(12) United States Patent
Li et al.

(10) Patent No.: US 11,797,522 B2
(45) Date of Patent: Oct. 24, 2023

(54) DATABASE LOG WRITING BASED ON LOG PIPELINE CONTENTION

(71) Applicant: INTERNATIONAL BUSINESS MACHINES CORPORATION, Armonk, NY (US)

(72) Inventors: Shuo Li, Beijing (CN); Xiaobo Wang, Beijing (CN); Jia Tian Zhong, Beijing (CN); Sheng Yan Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 182 days.

(21) Appl. No.: 17/162,063

(22) Filed: Jan. 29, 2021

(65) Prior Publication Data
US 2022/0245130 A1 Aug. 4, 2022

(51) Int. Cl.
*G06F 16/23* (2019.01)
*G06F 7/08* (2006.01)
*G06F 9/46* (2006.01)
*G06F 9/50* (2006.01)
*G06F 7/24* (2006.01)

(52) U.S. Cl.
CPC ............ *G06F 16/2379* (2019.01); *G06F 7/08* (2013.01); *G06F 9/466* (2013.01)

(58) Field of Classification Search
CPC ........ G06F 16/2379; G06F 7/08; G06F 9/466; G06F 9/5066; G06F 7/24; G06F 16/2358
See application file for complete search history.

(56) References Cited

U.S. PATENT DOCUMENTS

| | | | |
|---|---|---|---|
| 6,131,094 A * | 10/2000 | Gord | G06F 16/2358 710/200 |
| 8,909,996 B2 | 12/2014 | Srinivasan | |
| 9,009,101 B2 | 4/2015 | Bhatt et al. | |
| 10,878,335 B1 * | 12/2020 | Waugh | G06F 40/30 |
| 2003/0009477 A1 * | 1/2003 | Wilding | G06F 16/2358 |
| 2006/0224634 A1 * | 10/2006 | Hahn | G06F 16/2358 |

(Continued)

FOREIGN PATENT DOCUMENTS

| | | |
|---|---|---|
| CN | 108509327 A | 9/2018 |
| WO | WO03009139 A1 | 1/2003 |
| WO | WO2016122710 A1 | 8/2016 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Robert W Beausoliel, Jr.
*Assistant Examiner* — Mohammad S Bhuyan
(74) *Attorney, Agent, or Firm* — Stephanie Carusillo, Esq.; Blanche E. Schiller, Esq.; Heslin Rothenberg Farley & Mesiti P.C.

(57) ABSTRACT

Database log writing is based on log pipeline contention. A determination is made as to whether contention in writing data to a log pipeline, which is used in writing data from memory to storage, is at a prespecified level. Based on determining that the contention in writing the data to the log pipeline is at the prespecified level, a split operation is automatically performed to create a new log pipeline.

25 Claims, 23 Drawing Sheets

(56) References Cited

U.S. PATENT DOCUMENTS

| | | | | |
|---|---|---|---|---|
| 2010/0162247 A1* | 6/2010 | Welc | ................ | G06F 9/466 |
| | | | | 718/101 |
| 2012/0096055 A1* | 4/2012 | Lee | ................ | G06F 16/2358 |
| | | | | 707/822 |
| 2014/0214752 A1* | 7/2014 | Rash | ................ | G06F 16/254 |
| | | | | 707/600 |
| 2015/0261808 A1* | 9/2015 | Zhou | ................ | G06F 16/2358 |
| | | | | 707/703 |
| 2017/0004185 A1* | 1/2017 | Zhu | ................ | G06F 11/3006 |
| 2017/0212902 A1* | 7/2017 | Graefe | ................ | G06F 16/113 |
| 2017/0300391 A1* | 10/2017 | Namburi | ................ | G06F 11/1471 |
| 2019/0258515 A1* | 8/2019 | Mitchell | ................ | H04L 9/0643 |

OTHER PUBLICATIONS

Anonymous, "Page Grouped and Reverse-ordered Redo Logging to Accelerate Recovery for Database System," IPCOM000241919D, Jun. 9, 2015, pp. 1-4 (+ cover).

Zhang, Wenzhe et al., "Write-Combined Logging: An Optimized Logging for Consistency in NVRAM," Nov. 18, 2015, pp. 1-14.

IBM, "Improving Log Write Performance," Oct. 5, 2020, pp. 1-4.

Manamohan, Sathyanarayanan et al., BaSE (Byte addressable Storage Engine) Transaction Manager, Mar. 2016, pp. 1-9.

Oracle, "Oracle Database—Performance Tuning Guide," 10g Release 1, Dec. 2003, pp. 1-572.

* cited by examiner

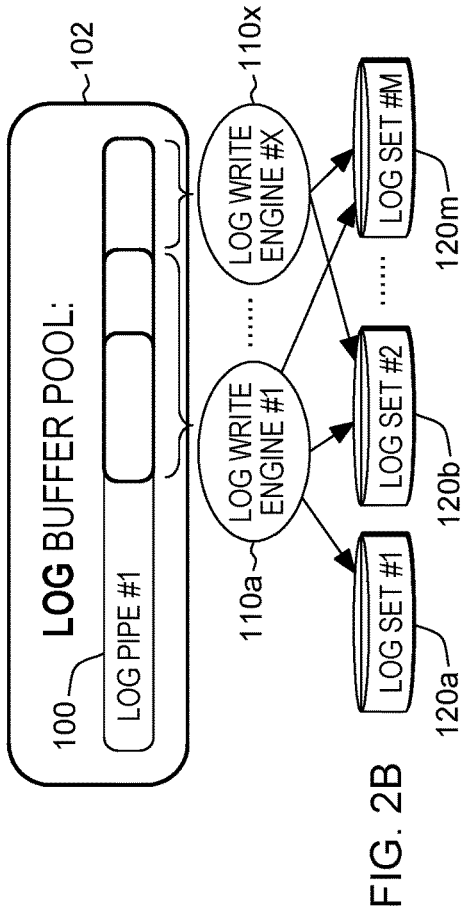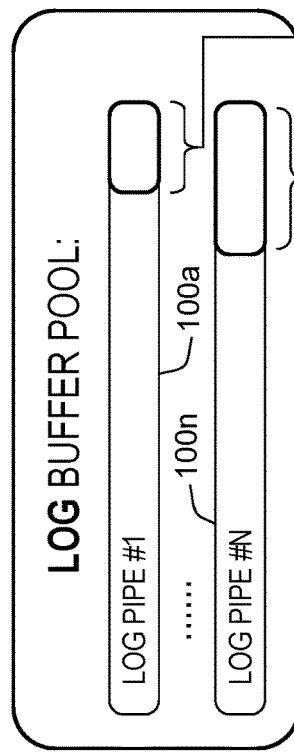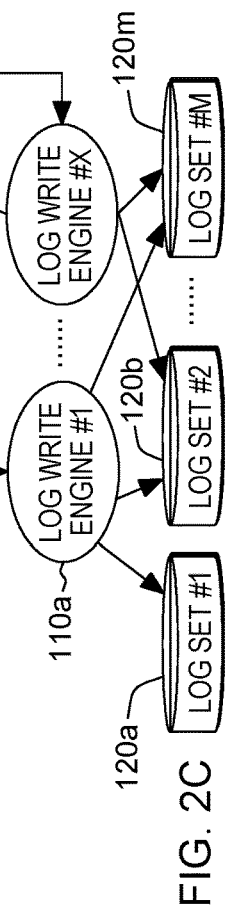
FIG. 2B
FIG. 2C
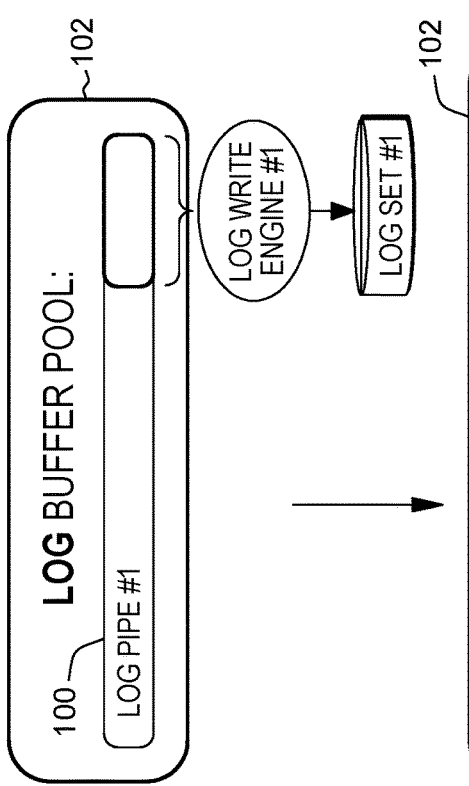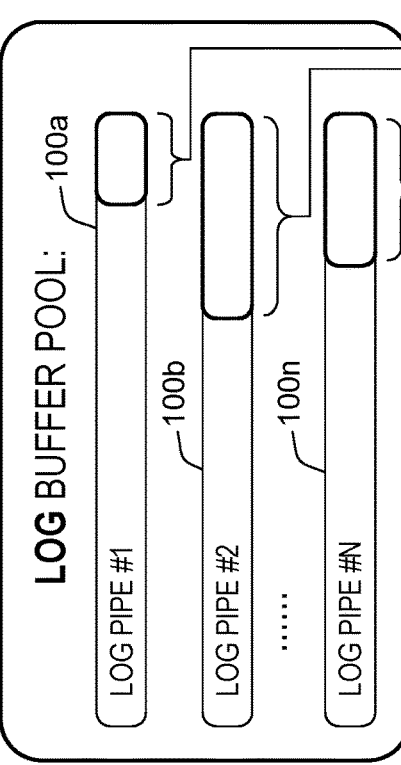
FIG. 2A

SPLITTING/MERGING LOG PIPELINES DYNAMICALLY, AND DEPLOYING LOG WRITE ENGINES ELASTICALLY IN TERMS OF SYSTEM THROUGHPUT AND LOG SERIALIZATION CONTENTION TO ACCELERATE UPDATE/DELETE/INSERT (UDI) OPERATIONS IN DATABASE:

A UNIT RECOVERY (UR) ROUTE MAP (REFERRED TO AS ORIGINAL UR ROUTE MAP) IS BUILT BY HASH UR IDS TO ROUTE EACH UR TO CORRESPONDING LOG PIPELINE FOR ITS LOG INFORMATION OUTPUT ~300

DATABASE LOG PERFORMANCE MONITOR SUPERVISES THE CONTENTION WITHIN A LOG PIPELINE IN LOG BUFFER POOL AND THEN SPLITS LOG PIPELINES WHEN CONTENTION IS HIGH TO ALLEVIATE SYSTEM PRESSURE, OR MERGES LOG PIPELINES WHEN CONTENTION IS LOW TO SAVE SYSTEM RESOURCES ~304  302

DURING LOG PIPELINES SPLIT/MERGE PROCESS, NO LOCK/LATCH IS REQUIRED AGAINST ORIGINAL UR ROUTE MAP (MAP #1) VIA BUILDING A NEW UR ROUTE MAP (MAP #2) WHERE UR IDS FROM MAP #1 IS RE-HASHED WITHIN MAP #2 ~306
- WHEN A NEW UR IS COMING, ONLY MAP #2 INSTEAD OF MAP #1 IS UPDATED. THEN, MAP #2 IS USED TO ROUTE THIS NEW UR TO CORRESPONDING LOG PIPELINE FOR LOG INFORMATION OUTPUT ~308
- WHEN AN OLD/EXISTING UR IS COMMITTED, BOTH MAP #1 AND MAP #2 ARE UPDATED BY REMOVING THIS UR ID FROM HASH TABLE ~310
- WHEN AN OLD/EXISTING UR IS COMING, USE MAP #2 TO ROUTE CORRESPONDING LOG PIPELINE FOR LOG INFORMATION OUTPUT IF THIS UR ID HAS BEEN ALREADY RE-HASHED IN MAP #2. OTHERWISE, MAP #1 IS USED TO DECIDE WHICH LOG PIPELINE IS RESPONSIBLE FOR LOG INFORMATION OUTPUT ~316
~312
314

FIG. 3A

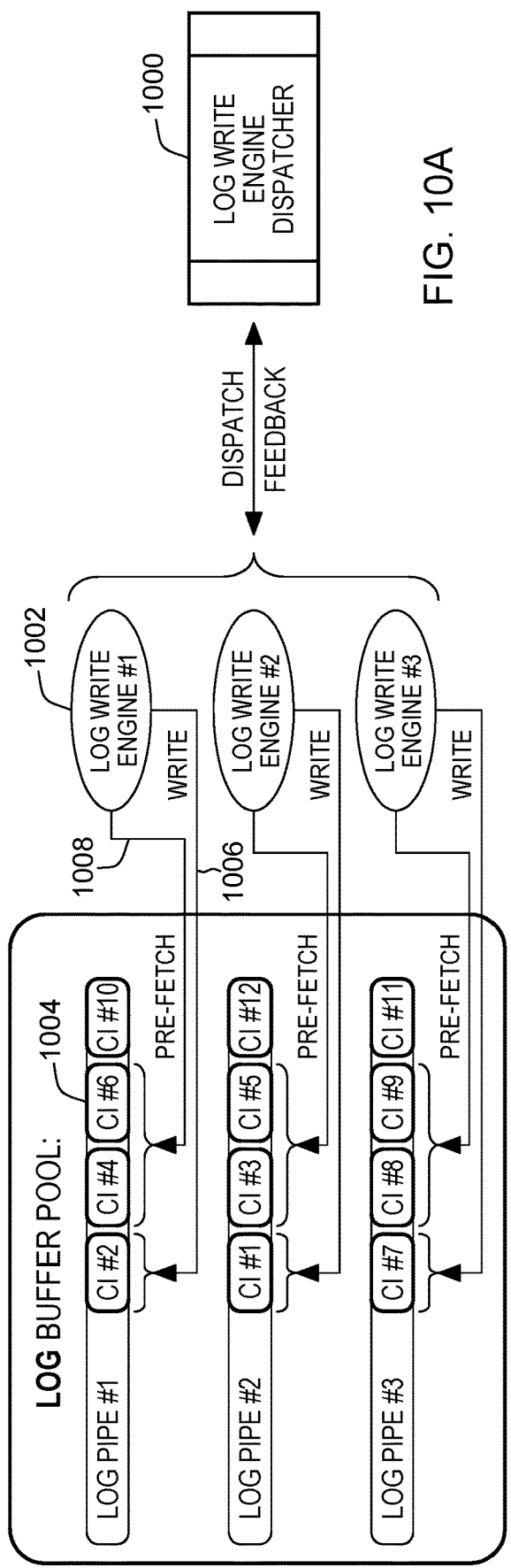
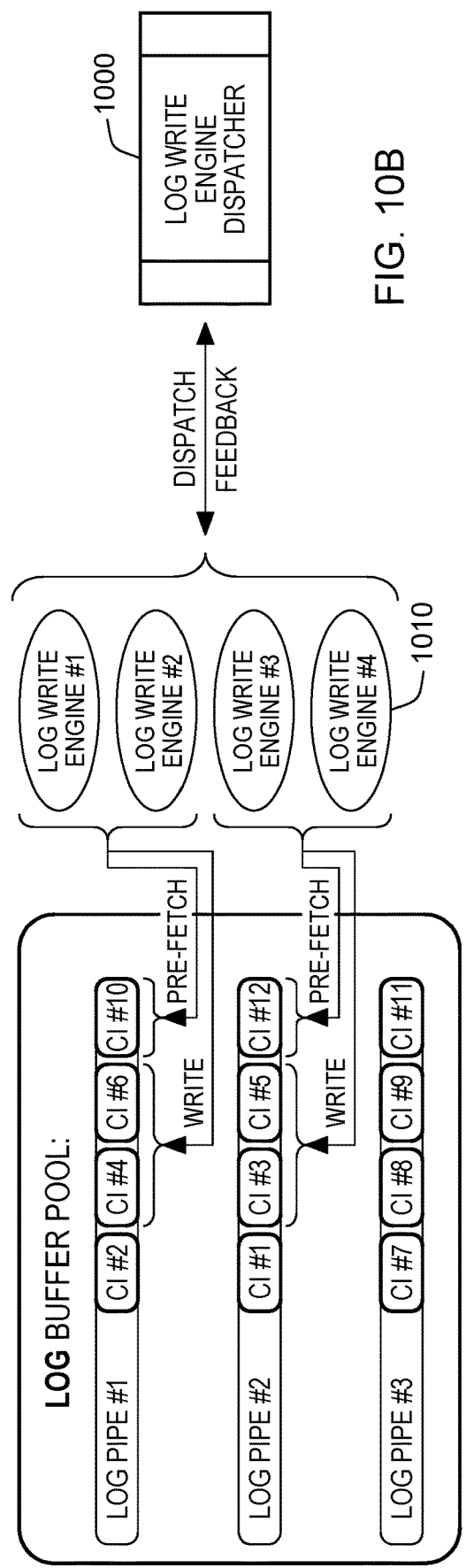
FIG. 10A
FIG. 10B

DETERMINING WHETHER CONTENTION IN WRITING DATA TO A LOG PIPELINE IS AT A PRESPECIFIED LEVEL, THE LOG PIPELINE USED IN WRITING THE DATA FROM MEMORY TO STORAGE ~1301 ~1300

BASED ON DETERMINING THAT CONTENTION IN WRITING THE DATA TO THE LOG PIPELINE IS AT THE PRESPECIFIED LEVEL, AUTOMATICALLY PERFORMING A SPLIT OPERATION TO CREATE A NEW LOG PIPELINE ~1302

ROUTING INCOMING DATA TO A SELECTED LOG PIPELINE BASED ON A ROUTE MAP ~1304

THE ROUTE MAP INCLUDES AN INDICATION OF WHICH LOG PIPELINE OF A PLURALITY OF LOG PIPELINES IS TO RECEIVE THE INCOMING DATA ~1306

THE PLURALITY OF LOG PIPELINES INCLUDES AT LEAST THE LOG PIPELINE AND THE NEW LOG PIPELINE ~1308

THE ROUTING INDICATED BY THE ROUTE MAP IS DETERMINED USING MODULO ARITHMETIC OF A SELECTED IDENTIFIER ~1310

A MODULO NUMBER USED IN THE MODULO ARITHMETIC IS BASED ON A NUMBER OF LOG PIPELINES IN THE PLURALITY OF LOG PIPELINES ~1312

THE SELECTED IDENTIFIER IS AN IDENTIFIER OF A UNIT RECOVERY ~1314

THE UNIT RECOVERY INCLUDES ONE OR MORE OPERATIONS GENERATING THE INCOMING DATA ~1316

THE ROUTE MAP IS CREATED BASED ON CREATING THE NEW LOG PIPELINE ~1318

FIG. 13A

DETERMINING WHETHER ONE OR MORE UNITS OF DATA ARE TO BE WRITTEN FROM MEMORY TO STORAGE ~1330

THE DETERMINING BEING BASED ON ONE OR MORE FLUSH POINTS WITHIN ONE OR MORE LOG PIPELINES ~1332

WRITING THE ONE OR MORE UNITS OF DATA FROM MEMORY TO STORAGE, BASED ON DETERMINING THAT THE ONE OR MORE UNITS OF DATA ARE TO BE WRITTEN FROM MEMORY TO STORAGE ~1334

1336

DETERMINING A MINIMUM FLUSH POINT FOR THE ONE OR MORE LOG PIPELINES

THE DETERMINING WHETHER A UNIT OF DATA OF THE ONE OR MORE UNITS OF DATA IS TO BE WRITTEN FROM MEMORY TO STORAGE INCLUDES DETERMINING WHETHER THE UNIT OF DATA HAS A TIMESTAMP THAT HAS A PREDEFINED RELATIONSHIP WITH THE MINIMUM FLUSH POINT, IN WHICH THE WRITING THE UNIT OF DATA IS PERFORMED, BASED ON THE UNIT OF DATA HAVING THE TIMESTAMP THAT HAS THE PREDEFINED RELATIONSHIP WITH THE MINIMUM FLUSH POINT ~1338

WRITING, USING A LOG WRITE ENGINE, LOG DATA FROM ONE OR MORE LOG PIPELINES TO STORAGE ~1350

AUTOMATICALLY DETERMINING WHETHER ONE OR MORE ADDITIONAL LOG WRITE ENGINES ARE TO BE DEPLOYED TO WRITE THE LOG DATA FROM THE ONE OR MORE LOG PIPELINES ~1352

BASED ON DETERMINING THAT THE ONE OR MORE ADDITIONAL LOG WRITE ENGINES ARE TO BE DEPLOYED, DEPLOYING THE ONE OR MORE ADDITIONAL LOG WRITE ENGINES ~1354

FIG. 13B

DETERMINING RECOVERY IS TO BE PERFORMED FOR ONE OR MORE DATABASE OBJECTS ～1370

BASED ON DETERMINING THAT RECOVERY IS TO BE PERFORMED, SORTING A PLURALITY OF RECORDS READ FROM STORAGE USING A FIRST TECHNIQUE TO PROVIDE A FIRST PLURALITY OF SORTED RECORDS ～1372

THE FIRST PLURALITY OF SORTED RECORDS INCLUDING A FIRST PLURALITY OF LOG UNITS ～1374

PROVIDING THE FIRST PLURALITY OF SORTED RECORDS TO A REDO OPERATION ～1376

THE REDO OPERATION TO BE PERFORMED IN PARALLEL ON THE FIRST PLURALITY OF LOG UNITS ～1378

DETERMINING RECOVERY IS TO BE PERFORMED FOR ONE OR MORE DATABASE OBJECTS ～1380

BASED ON DETERMINING THAT RECOVERY IS TO BE PERFORMED, SORTING A PLURALITY OF RECORDS READ FROM STORAGE USING A SECOND TECHNIQUE TO PROVIDE A SECOND PLURALITY OF SORTED RECORDS ～1382

THE SECOND PLURALITY OF SORTED RECORDS INCLUDING A SECOND PLURALITY OF LOG UNITS ～1384

PROVIDING THE SECOND PLURALITY OF SORTED LOG RECORDS TO AN UNDO OPERATION ～1386

THE UNDO OPERATION TO BE PERFORMED IN PARALLEL ON THE SECOND PLURALITY OF LOG UNITS ～1388

DETERMINING WHETHER CONTENTION IN WRITING DATA TO ONE OR MORE LOG PIPELINES IS AT ANOTHER PRESPECIFIED LEVEL ～1390

BASED ON DETERMINING THAT CONTENTION IN WRITING THE DATA TO THE ONE OR MORE LOG PIPELINES IS AT THE OTHER PRESPECIFIED LEVEL, PERFORMING A MERGE OPERATION TO REDUCE A NUMBER OF LOG PIPELINES ～1392

FIG. 13C

DATABASE LOG WRITING BASED ON LOG PIPELINE CONTENTION

BACKGROUND

One or more aspects relate, in general, to facilitating processing within a computing environment, and in particular, to facilitating processing associated with database systems of the computing environment.

A database system typically includes one or more databases and at least one database management system. A database is an organized collection of data electronically stored and accessed, and a database management system is a mechanism used to interact with one or more databases, as well as users and applications that use the one or more databases. The database management system provides various functions to manage the databases including an update function providing insertion, deletion and modification of the data maintained in the databases; retrieval of the data in the databases; administration of the databases including providing data security, data integrity, performance monitoring, etc.; and definition of the organization of the data.

The data maintained in the databases is written to a log (also referred to as a log pipe or log pipeline) prior to being written to storage. The speed at which the data is written to the log and to storage impacts the performance of update, delete and insert operations of the databases, affecting system performance. For example, update, delete and insert operations are slowed down under high concurrency of the log due to log materialization to storage. Further, system performance is impacted since the log data is to be written to storage prior to modified data in pages of memory are written out to storage. Therefore, a degradation in writing the log data to storage may degrade the flushing of modified data from memory to storage.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes determining whether contention in writing data to a log pipeline is at a prespecified level. The log pipeline is used in writing the data from memory to storage. Based on determining that contention in writing the data to the log pipeline is at the prespecified level, a split operation is automatically performed to create a new log pipeline. By performing the split operation, contention on the log pipeline is reduced and a rate at which data is able to be written to the log pipelines is increased, thereby enabling data to be written to storage faster, increasing system performance.

In one aspect, incoming data is routed to a selected log pipeline based on a route map. The route map includes an indication of which log pipeline of a plurality of log pipelines is to receive the incoming data. The plurality of log pipelines includes at least the log pipeline and the new log pipeline. The use of a route map facilitates tracking where the log data is written in the log pipelines, which facilitates, at the very least, restart and/or recovery operations.

As an example, the routing indicated by the route map is determined using modulo arithmetic of a selected identifier. A modulo number used in the modulo arithmetic is based on, for instance, a number of log pipelines in the plurality of log pipelines. In one example, the selected identifier is an identifier of a unit recovery, and the unit recovery includes one or more operations generating the incoming data. Modulo arithmetic enables a re-hashing of selected identifiers, facilitating the routing of incoming data.

In one embodiment, the route map is created based on creating the new log pipeline. As an example, the creating of the route map (e.g., a new route map) enables a log pipeline split/merge process to be performed without requiring a lock/latch on one or more predecessor route maps, improving system performance.

In one aspect, a determination is made as to whether one or more units of data are to be written from memory to storage. The determining is based on one or more flush points within one or more log pipelines. Based on determining that the one or more units of data are to be written from memory to storage, the one or more units of data are written from memory to storage. By using the flush points, units of data may be written to memory concurrently with writing data to log pipelines, improving system performance.

In one embodiment, a determination is made of a minimum flush point for the one or more log pipelines, and the determining whether a unit of data of the one or more units of data is to be written from memory to storage includes determining whether the unit of data has a timestamp that has a predefined relationship with the minimum flush point. Based on the unit of data having the timestamp that has the predefined relationship with the minimum flush point, the writing of the unit of data is performed. This enables units of data (e.g., pages of data), as an example, to be written to storage concurrently with writing data to the log pipes, which increases system performance.

In one aspect, a log write engine is used to write log data from one or more log pipelines to storage. A determination is automatically made as to whether one or more additional log write engines are to be deployed to write the log data from the one or more log pipelines. Based on determining that the one or more additional log write engines are to be deployed, the one or more additional log write engines are deployed. By providing additional log write engines, the speed at which data may be written to storage is increased, thereby, increasing system performance. Further, in one or more aspects, by increasing the speed at which log data may be written to storage, the speed at which modified pages of memory, as an example, may be written from memory to storage is also increased.

In one aspect, a determination is made as to whether recovery is to be performed for one or more database objects. Based on determining that recovery is to be performed, a plurality of records read from storage are sorted using a first technique to provide a first plurality of sorted records. The first plurality of sorted records includes a first plurality of log units. The first plurality of sorted records is provided to a redo operation. The redo operation is to be performed in parallel on the first plurality of log units. This enables database recovery processing to be performed in parallel while maintaining data integrity.

In one aspect, a determination is made as to whether recovery is to be performed for one or more database objects. Based on determining that recovery is to be performed, a plurality of records read from storage are sorted using a second technique to provide a second plurality of sorted records. The second plurality of sorted log records includes a second plurality of log units. The second plurality of sorted records is provided to an undo operation. The undo operation is to be performed in parallel on the second plurality of log units. This enables database recovery processing to be performed in parallel while maintaining data integrity.

In one aspect, a determination is made as whether contention in writing data to one or more log pipelines is at another prespecified level. Based on determining that contention in writing the data to the one or more log pipelines is at the other prespecified level, a merge operation is performed to reduce a number of log pipelines. By performing the merge operation, fewer log pipelines, and thus fewer system resources, are utilized.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 2A depicts one example of a split operation to create additional log pipelines, in accordance with one or more aspects of the present invention;

FIG. 2B depicts one example of deploying additional log write engines to write log information from the log pipelines to storage, in accordance with one or more aspects of the present invention;

FIG. 2C depicts one example of a split operation to create additional log pipelines and deploying one or more additional log write engines, in accordance with one or more aspects of the present invention;

FIGS. 3A-3C depict one embodiment of processing associated with facilitating the writing of data to log pipelines, the writing of log data from log pipelines to storage, the writing of modified pages of memory to storage, and/or database restart/recovery, in accordance with one or more aspects of the present invention;

FIGS. 10A-10B depict one example of using control intervals to flush log information from log pipelines to storage, in accordance with one or more aspects of the present invention;

FIGS. 13A-13C depict aspects of one embodiment of facilitating processing within a computing environment, in accordance with one or more aspects of the present invention;

DETAILED DESCRIPTION

In accordance with one or more aspects, a capability is provided to facilitate the writing of data from memory to log pipelines (also referred to as log pipes, logs or pipes) and from log pipelines to storage. In one or more aspects, the capability includes dynamically splitting a log pipeline into one or more other log pipelines based on detecting that contention on the log pipeline is at a prespecified level (e.g., above a selected threshold) such that additional log pipelines are available for receiving data to be written to storage. In one or more further aspects, the capability includes merging one or more log pipelines based on detecting that contention on at least one log pipeline is at another prespecified level (e.g., below a selected threshold). Further, in one or more aspects, the capability includes dynamically increasing the number of log write engines to write log data from one or more log pipelines to storage.

By splitting a log pipeline to provide one or more additional log pipelines to receive data to be written to storage, contention on a particular log pipeline is reduced, increasing the speed at which data may be written to the log pipeline and at which the log data may be written to storage thereby, increasing system performance. Further, by increasing the speed at which log data may be written to storage, the speed at which modified pages of memory may be written from memory to storage is also increased, since the writing of selected modified pages occurs subsequent to the writing of certain log data from the one or more log pipelines to storage, as determined by, for instance, comparison of timestamps.

Similarly, by increasing the number of write engines to write the log data from a log pipeline to storage, the speed at which data may be written to the log pipeline and at which the log data may be written to storage are increased thereby, increasing system performance. Again, by increasing the speed at which log data may be written to storage, the speed at which modified pages of memory may be written from memory to storage is also increased, since the writing of selected modified pages occurs subsequent to the writing of certain log data from the one or more log pipelines to storage, as determined by, for instance, comparison of timestamps.

Figure 1A:
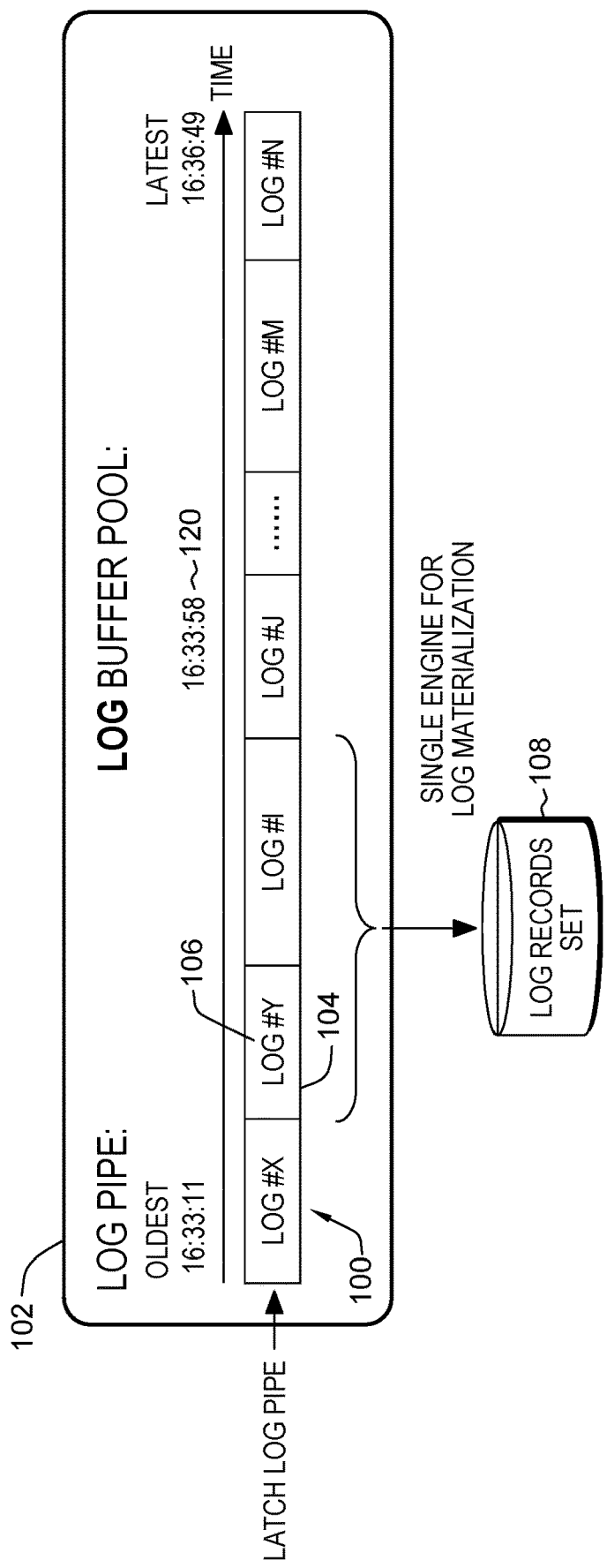
FIG. 1A depicts one example of a log pipeline used, in accordance with one or more aspects of the present invention.

Referring to FIG. 1A, a log pipeline 100 is included in a log buffer pool 102 and includes a plurality of log entries 104. Each log entry 104 includes data, such as a log record 106 (also referred to as log data or log information). In one example, each log record has a timestamp 120 associated therewith indicating when the log record was written to the pipe. Data is written from memory (e.g., based on an update, delete, insert to a database) to a log pipe prior to be written to storage. In writing the data to log pipeline 100, serialization is performed on the log pipeline via, for instance, a latch queue, since it is to be decided which log entry is to be written first, and so on. This serialization causes contention on the log pipeline resulting in a bottleneck that negatively impacts system performance. Additionally, in this example, log records 106 are written to storage 108 via a single log write engine. With using a single log write engine, it takes time to write the data from the log pipeline to storage resulting in another bottleneck that negatively impacts system performance.

Figure 1B:
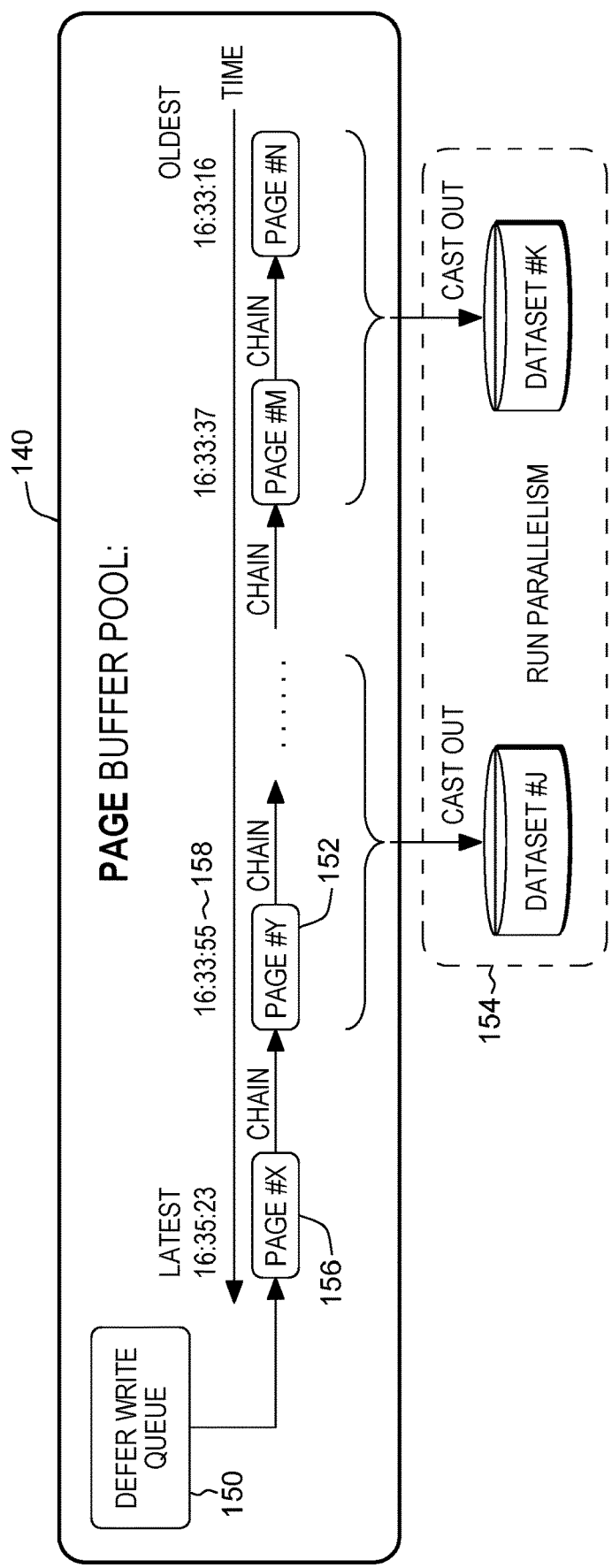
FIG. 1B depicts one example of a page buffer pool used, in accordance with one or more aspects of the present invention.

Further, as described herein, the log data is to be written to storage prior to selected modified data being flushed from memory to storage. As shown in FIG. 1B, a page buffer pool 140 includes a defer write queue 150 that includes a plurality of entries 152 chained together. Each entry includes, for instance, a unit of data to be written to storage 154. In one example, the unit of data is a page of data 156, which has a timestamp 158 associated therewith indicating, for instance, a time in which the page was modified. (A page may be of any select size.) In one embodiment, timestamps 158 and timestamps 120 are used to determine when the page of data may be written from the defer write queue to storage. For instance, if a timestamp of a page of data in the defer write queue (e.g., 16:33:55) is less than a timestamp of the last log written from the log pipeline (e.g., 16:33:58), then the page of data may be written from defer write queue 150 to storage 154. By allowing data to be written from the defer write queue to storage concurrently with writing data from the log pipeline to storage, based on the timestamps, parallelism in writing modified data to storage is provided, increasing system performance.

In accordance with one or more aspects of the present invention, to accelerate database processing including, for instance, update, delete and/or insert operations in databases, a log pipeline used to write log data from memory to storage is monitored to determine if contention on the log pipeline is at an unacceptable level. The contention may be caused by a bottleneck in writing the data to the log pipe and/or in writing the log data from the log pipe to storage. If it is determined that contention on the log pipeline is too high (e.g., the level of contention is at a prespecified level, such as greater than a selected threshold) and/or based on other criteria, a splitting operation is performed to automatically create one or more additional log pipelines to reduce the contention on one or more existing log pipelines (referred to herein as splitting a log pipeline). For instance, as shown in FIG. 2A, if it is determined that contention on log pipeline 100 is too high, a split operation is automatically performed to create one or more additional log pipelines. Data is then routed to log pipelines 100a-100n in log buffer pool 102, instead of just log pipeline 100 or a number of log pipelines fewer than log pipelines 100a-100n. In one embodiment, data from the multiple log pipelines 100a-100n is written to storage using a single log write engine 110. Single log write engine 110 writes log data from, e.g., the multiple log pipelines 100a-100n into a log set 120 in storage.

Referring to FIG. 2B, in one aspect, based on contention in writing log information from the log pipeline to storage being too high (e.g., at a prespecified level, such as greater than a selected threshold) and/or based on other criteria, one or more additional log write engines are automatically deployed, such that log write engines 110a-110x are used to write data from log pipeline 100 to one or more log sets 120a-120m. By using multiple log write engines, the speed at which data may be written from log pipeline 100 to storage (e.g., one or more of log sets 120a-120m) is increased. Further, by increasing the speed at which data is removed from the log pipeline, the rate at which data may be written to the log pipeline is increased, as well as the rate at which units of data, such as memory pages, that have been modified may be written from memory to storage.

In one or more aspects, referring to FIG. 2C, based on contention on one or more log pipelines being too high and/or based on other criteria, a split operation is dynamically performed to automatically create one or more additional log pipelines, such that log pipelines 100a-100n are used to receive log records, and one or more additional log write engines are automatically deployed, such that log engines 100a-110x are used to write the log data in the multiple log pipelines to one or more log sets 120a-120m.

In a further aspect, when contention on one or more log pipelines is too low (e.g., the level of contention is at another prespecified level, such as less than a selected threshold), then a merging operation is performed to merge at least one log pipeline with at least one other log pipeline. For instance, data is routed to fewer log pipelines.

Figure 3B:
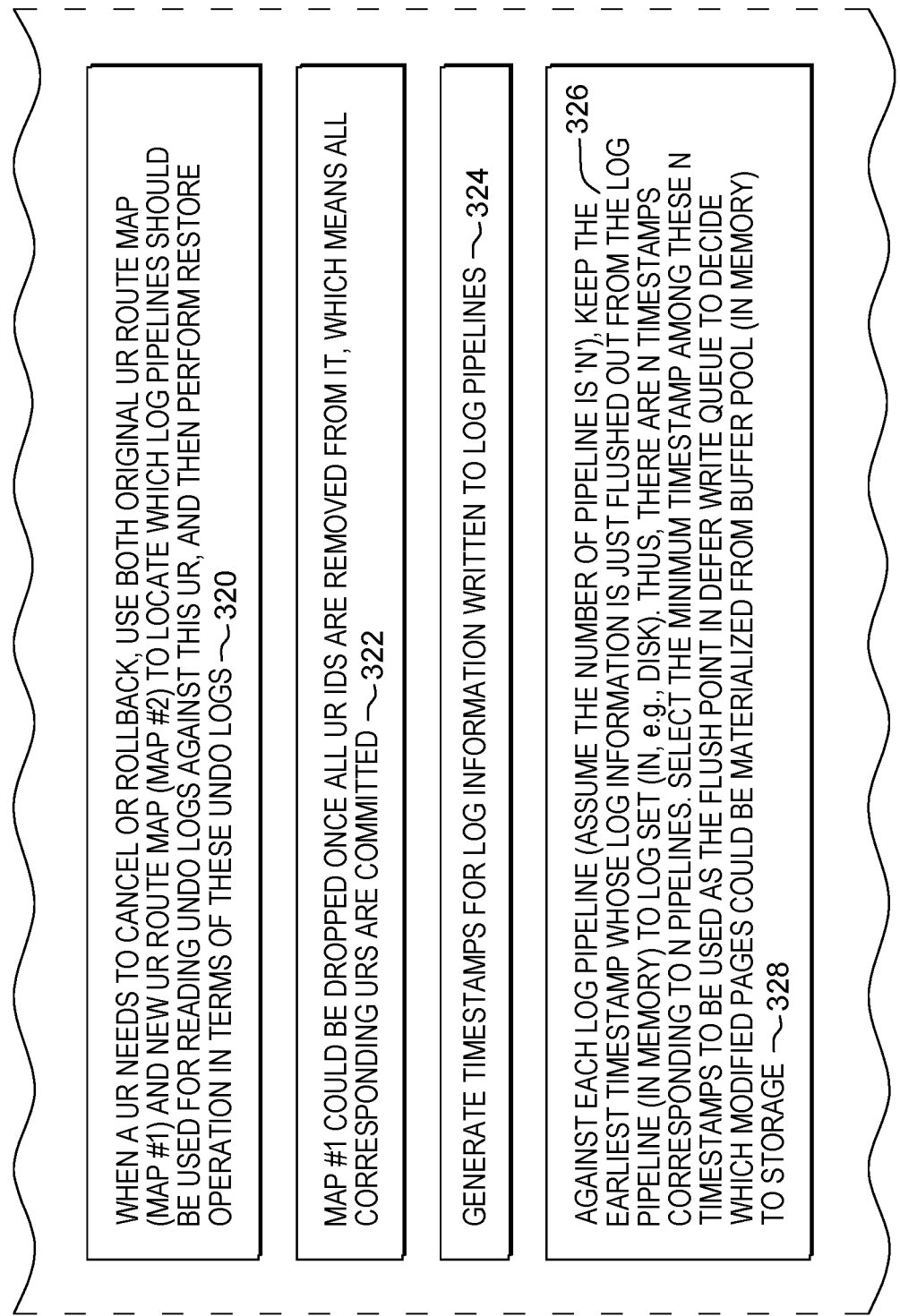
Figure 3C:
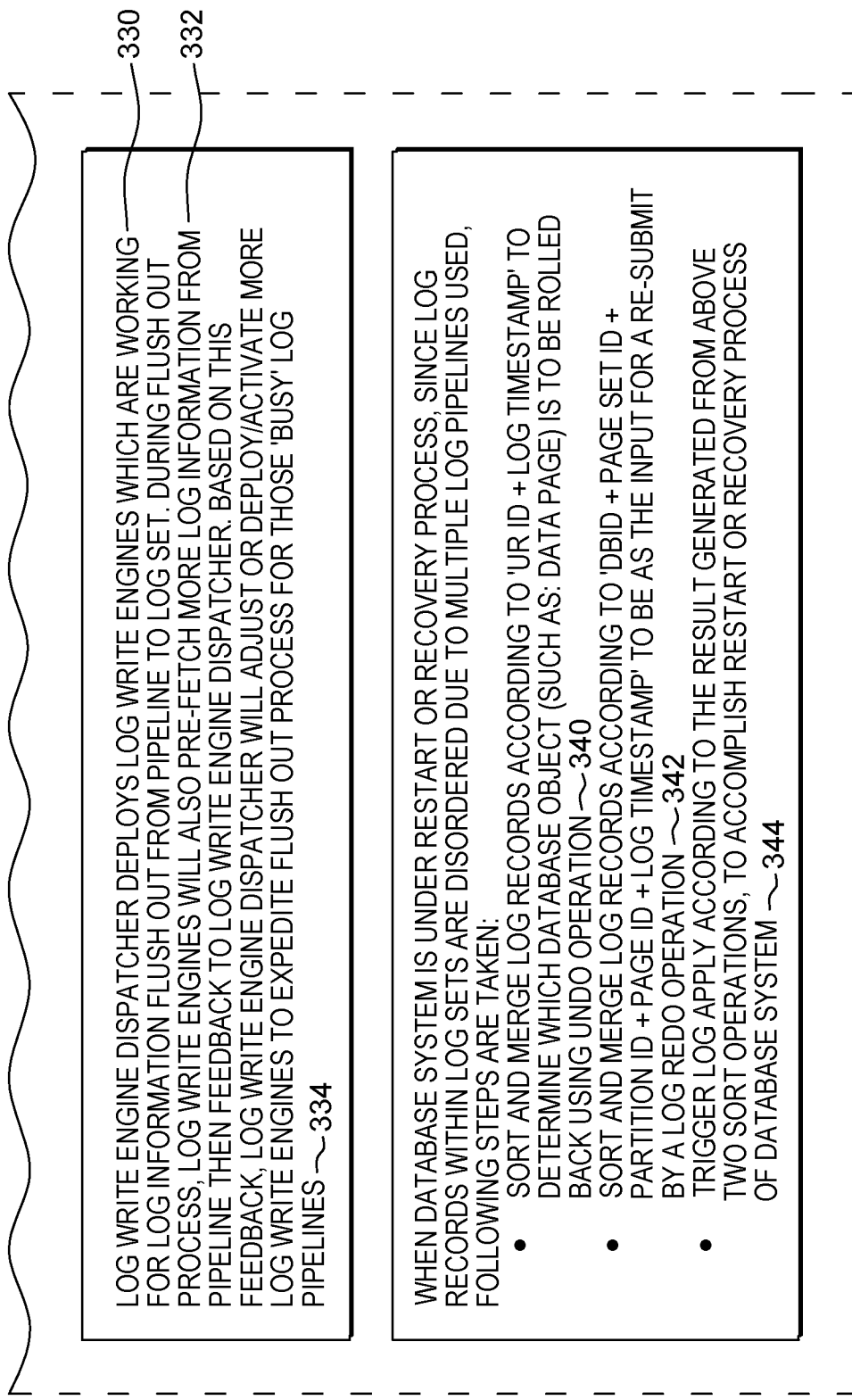

Further details of dynamically splitting/merging log pipelines and deploying additional log write engines to accelerate, for instance, update, delete, and/or insert operations in databases to enhance system throughput and decrease log serialization contention are described with reference to FIGS. 3A-3C, as well as FIGS. 4-11. In particular, FIGS. 3A-3C provide an overview of various aspects of the present invention, and FIGS. 4-11 provide further details of selected aspects.

Referring to FIG. 3A, in one aspect, to facilitate the writing of data (e.g., log records) to multiple pipelines and/or to facilitate database restart and/or recovery, log records resulting from operations performed as part of a unit, referred to as a unit recovery, are routed to a same pipeline. As an example, each unit recovery includes operations performed from one commit point of a transaction or program to another commit point of the transaction or program. A unit recovery (e.g., log records generated based on operations of the unit of recovery) is written to a selected log pipeline and since, in accordance with an aspect of the present invention, multiple log pipelines may exist, the log pipeline is selected via a unit recovery route map. A unit recovery route map (referred to as an original unit recovery route map or map #1) is built and used to route each unit recovery to a selected log pipeline for its log information output (300). This is further described with reference to FIGS. 4-5.

Figure 4:
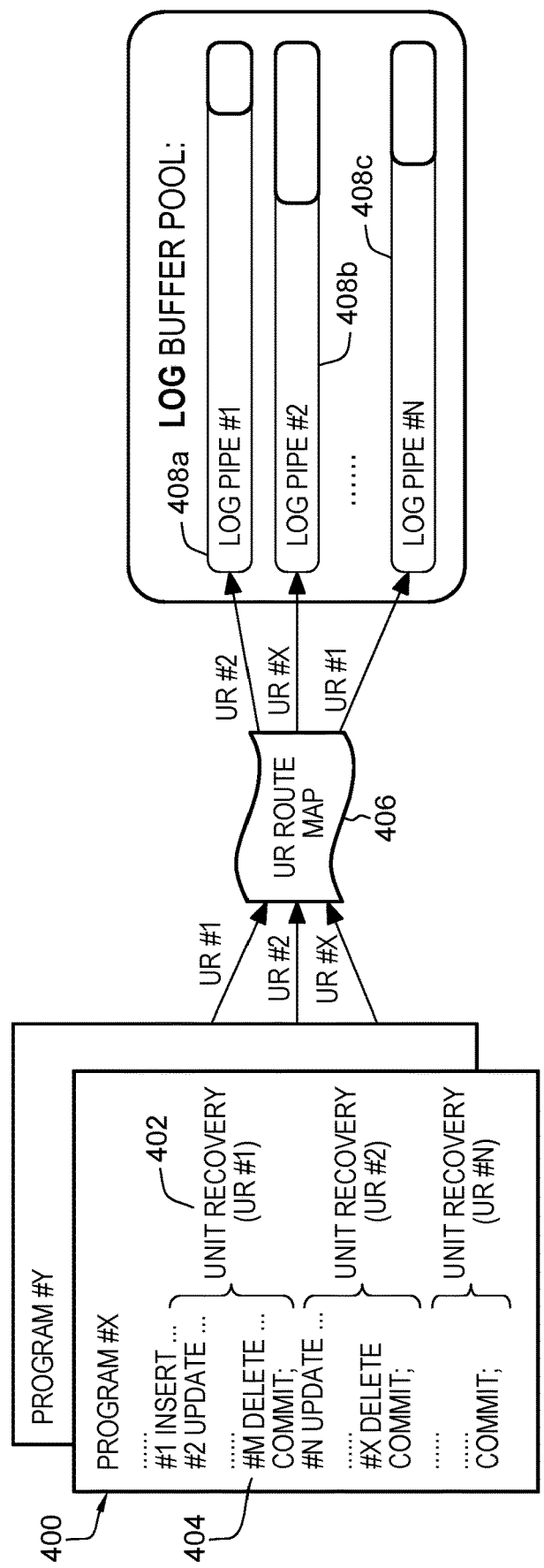
FIG. 4 depicts one example of using a unit recovery route map to route unit recoveries to log pipelines, in accordance with one or more aspects of the present invention.

As shown in FIG. 4, in one example, a program, such as Program #X 400, includes a plurality of unit recoveries 402. A unit recovery 402 includes one or more operations 404 between, for instance, a beginning of a program and a first commit point, between two commit points or between a commit point and an end of the program. As examples, Unit Recovery #1 includes #1 insert, #2 update . . . and #M delete; Unit Recovery #2 includes #N update . . . #X delete; etc. The unit recovery IDs (e.g., 1, 2 . . . ) are input to a unit recovery route map 406 that indicates which log pipeline is to be used to buffer the unit recovery data resulting from the operations. In the example in FIG. 4, UR #1 is routed to log pipeline #N 408c, UR #2 is routed to log pipeline 408a, and UR #X is routed to log pipeline 408b.

Figure 5:
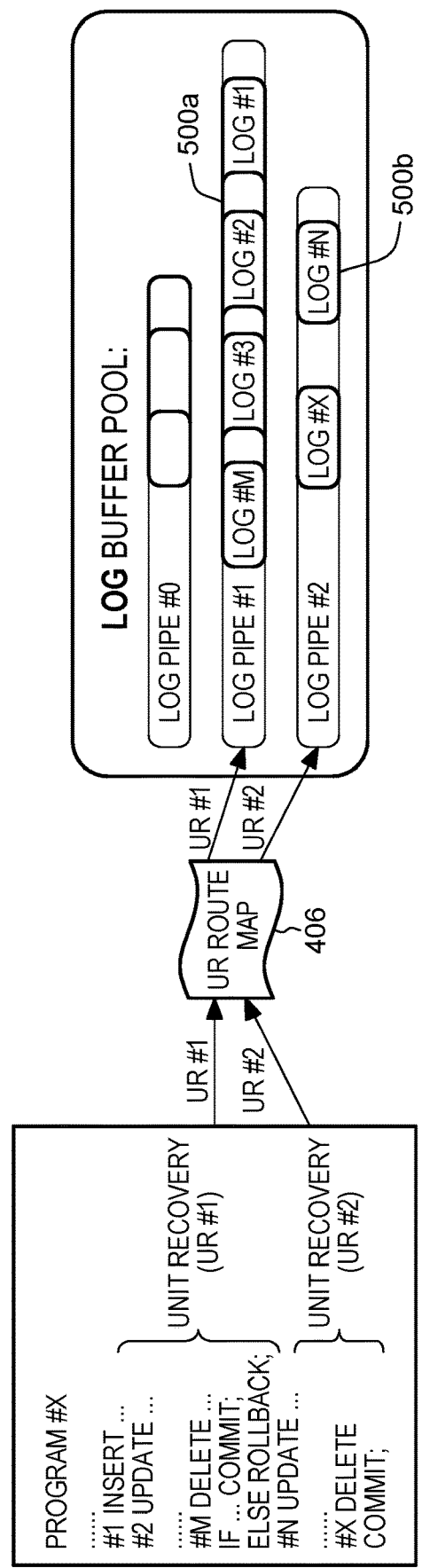
FIG. 5 depicts another example of using a unit recovery route map to route unit recoveries to log pipelines, in accordance with one or more aspects of the present invention.

In one embodiment, an entire unit recovery is written to a single log pipeline, as shown in FIG. 5. For instance, data (e.g., log records) of operation #1-operation #M of UR #1 are routed via unit recovery route map 406 to a log pipeline 500a; and data (e.g., log records) of operation #N-operation #X of UR #2 are routed via unit recovery route map 406 to a log pipeline 500b. In one example, the log pipeline is selected via a hash of the unit recovery ID. For instance, if there are three log pipelines to select from, then for unit recovery ID #1, 1 mod (modulo) 3 is equal to 1, and log pipeline #1 is selected. Similarly, for unit recovery ID #2, 2 mod 3 is equal to 2, and log pipeline #2 is selected, etc. By having the data (e.g., log records) for all the operations of a unit recovery in a single log pipeline, instead of the data (e.g., log records) for one or more of the operations of a unit recovery routed to different log pipelines, recovery functions, such as cancel, rollback and backout functions, are facilitated. In one example, to perform recovery, a log pipeline is traversed backwards to locate the log data of the unit recovery being recovered. This backwards traversal is facilitated (e.g., quicker) if the log data of the unit recovery is in one log pipeline.

Returning to FIG. 3A, in one aspect, a database log performance monitor (a.k.a., log performance monitor) supervises contention within a log pipeline in the log buffer pool and automatically splits a log pipeline into multiple log pipelines based on the contention being too high (e.g., level of contention is at a prespecified level; e.g., above a selected threshold) in order to alleviate system pressure (302); or merges log pipelines when the contention is too low (e.g., level of contention is at another prespecified level; e.g., below a selected threshold) to save system resources (304). In one example, to determine contention, the database log performance monitor monitors the log buffer pool (e.g., one or more log pipelines) and/or one or more latch queues to determine whether contention on one or more of the log pipelines is too high or too low relative to one or more prespecified levels.

For instance, in writing the data to a log pipeline, serialization is performed via, for instance, a latch queue. There is, e.g., a corresponding latch queue for each log pipe to serialize information written to the log pipe. As an example, if thread 1 is going to write information into log pipe #1, it acquires an exclusive latch before the write operation. Similarly, if thread #2 is also going to write log information into log pipe #1, it is to acquire an exclusive latch. Since an exclusive latch is only granted to one thread at a time, the request of thread #2 is put into the latch queue for waiting. Therefore, the longer the latch queue (e.g., number of waiting components (e.g., threads) in the latch queue), the higher the log pipe contention. Thus, the length of latch queue is used, in one example, to determine whether contention is low or high. If the database log performance monitor determines that the contention is too high (e.g., latch queue has a number of waiting components over X, where X is selected based on preference, performance goals, etc.), a split operation is performed to create one or more additional log pipelines.

In one example, to create a new log pipeline, memory addresses of the log buffer pool are assigned to the new log pipeline; an identifier is assigned to the new log pipeline; and a unit recovery route map is created to route data (e.g., unit recoveries) to the log pipelines, including the one or more additional log pipelines. Additional, fewer and/or other actions may be performed to create a new log pipeline.

Likewise, if the database log performance monitor determines that the contention is too low (e.g., latch queue has a number of waiting components (e.g., threads) under Y, where Y is selected based on preference, performance goals, etc.), a merge operation is performed to decrease the number of log pipelines to which data is routed. For instance, a unit recovery route map is created that routes to one or more fewer log pipelines.

Although in the above examples contention is based on the number of components waiting, it may be based on other factors related or not to the latch queue. Many examples are possible.

Figure 6:
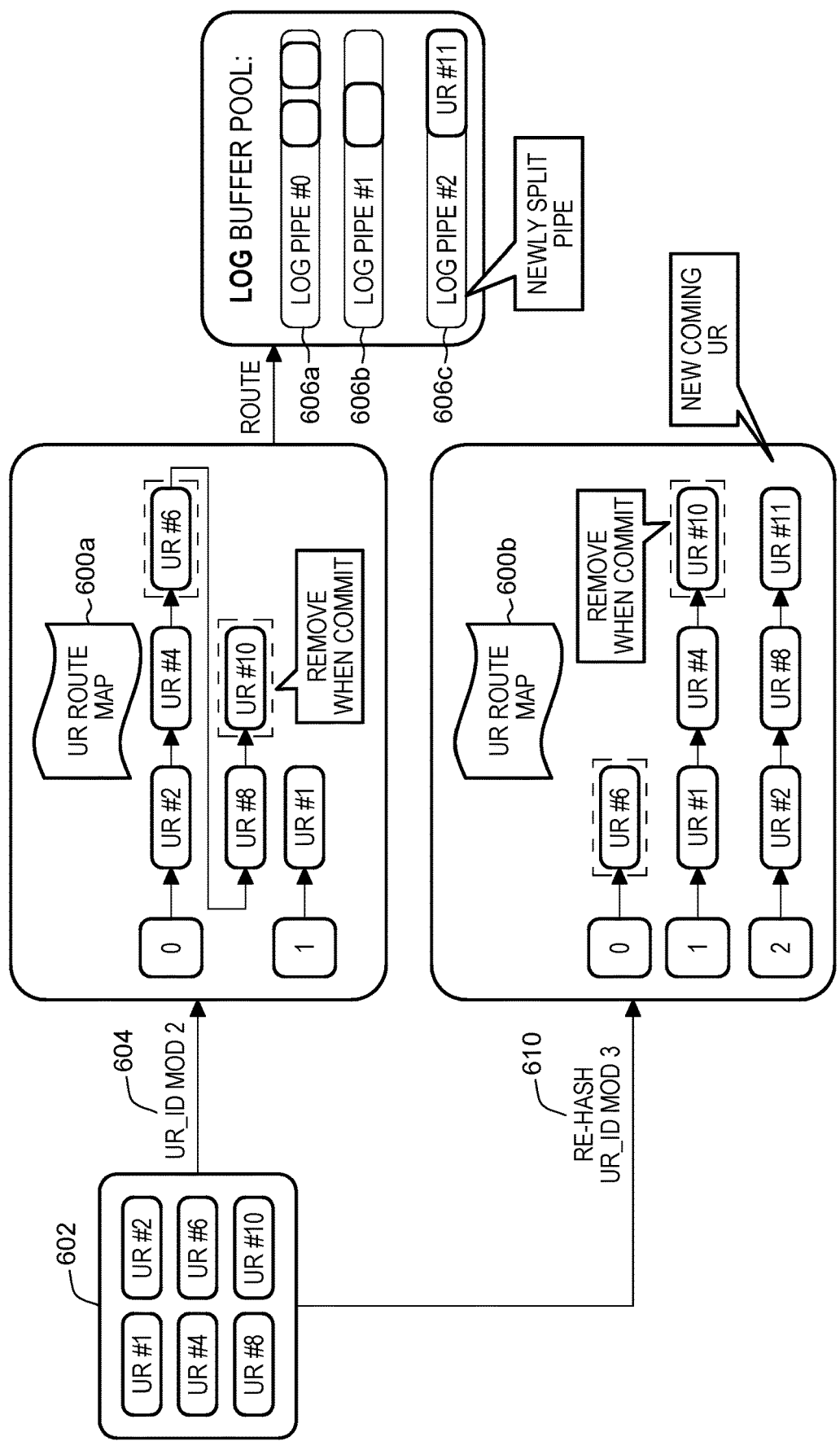
FIG. 6 depicts one example of dynamically splitting a log pipeline and creating a new unit recovery route map, in accordance with one or more aspects of the present invention.

As indicated, during a log pipeline split/merge process, a new unit recovery route map is built. In one embodiment, during the split/merge process, no lock/latch is required against the original unit recovery route map (e.g., map #1) due to the building of the new unit recovery route map (e.g., map #2). Based on building the new unit recovery route map, unit recovery identifiers from map #1 are re-hashed within map #2 (306). For instance, as shown in FIG. 6, in this example, a current unit recovery route map 600a was built by hashing the UR_IDs (e.g., UR #1, UR #2, UR #4, UR #6, UR #8 and UR #10) included in hash table 602. Since in this example, initially, there are two log pipelines, the UR_ID mod 2 (604) is used to assign each unit recovery to a log pipeline. For instance, UR #1 is routed to log pipeline 1 (606b) and the remaining unit recoveries (e.g., #2, #4, #6, #8 and #10) are routed to log pipeline 0 (606a). Based on a determination that one of the pipelines is to be split, a third pipeline is created. At first, this pipeline is invisible to the unit recoveries. It becomes visible, in one example, based on creating a new unit recovery route map 600b. Since there are three log pipelines in this example, UR_ID mod 3 (610) is used to create UR route map 600b to route the unit recoveries to the three log pipelines 606a, 606b, 606c. For instance, by adding log pipeline #2, UR #6 continues to be routed to log pipeline 0; UR #1, UR #4 and UR #10 are routed to log pipeline #1; and UR #2, UR #8 and UR #11 are routed to log pipeline #2.

Referring to FIG. 3A and FIG. 6, in one example, when a new unit recovery arrives (e.g., UR #11), only one unit recovery route map (e.g., 600*b*) is updated (308); the original unit recovery route map (or other predecessor unit recovery route map(s)) is not updated, in this example. The updated unit recovery route map (e.g., map #2 600*b*) is used to route the new unit recovery to the corresponding log pipeline for log information output (310). For instance, UR #11 is routed to log pipeline #2 (606*c*); e.g., 11 mod 3=2.

In one example, when an existing unit recovery is committed, both map #1 (600*a*) and map #2 (600*b*) are updated by removing this unit recovery identifier from hash table 602 (312). For instance, when UR #10 is committed, UR #10 is removed from UR route map 600*a* and UR route map 600*b*. In one example, the removal is performed by updating hash table 602, including removing UR #10, and re-hashing the existing UR ids. In another example, the removal is performed by directly removing UR #10 from UR route tables 600*a*, 600*b*. Other examples are also possible.

Figure 7:
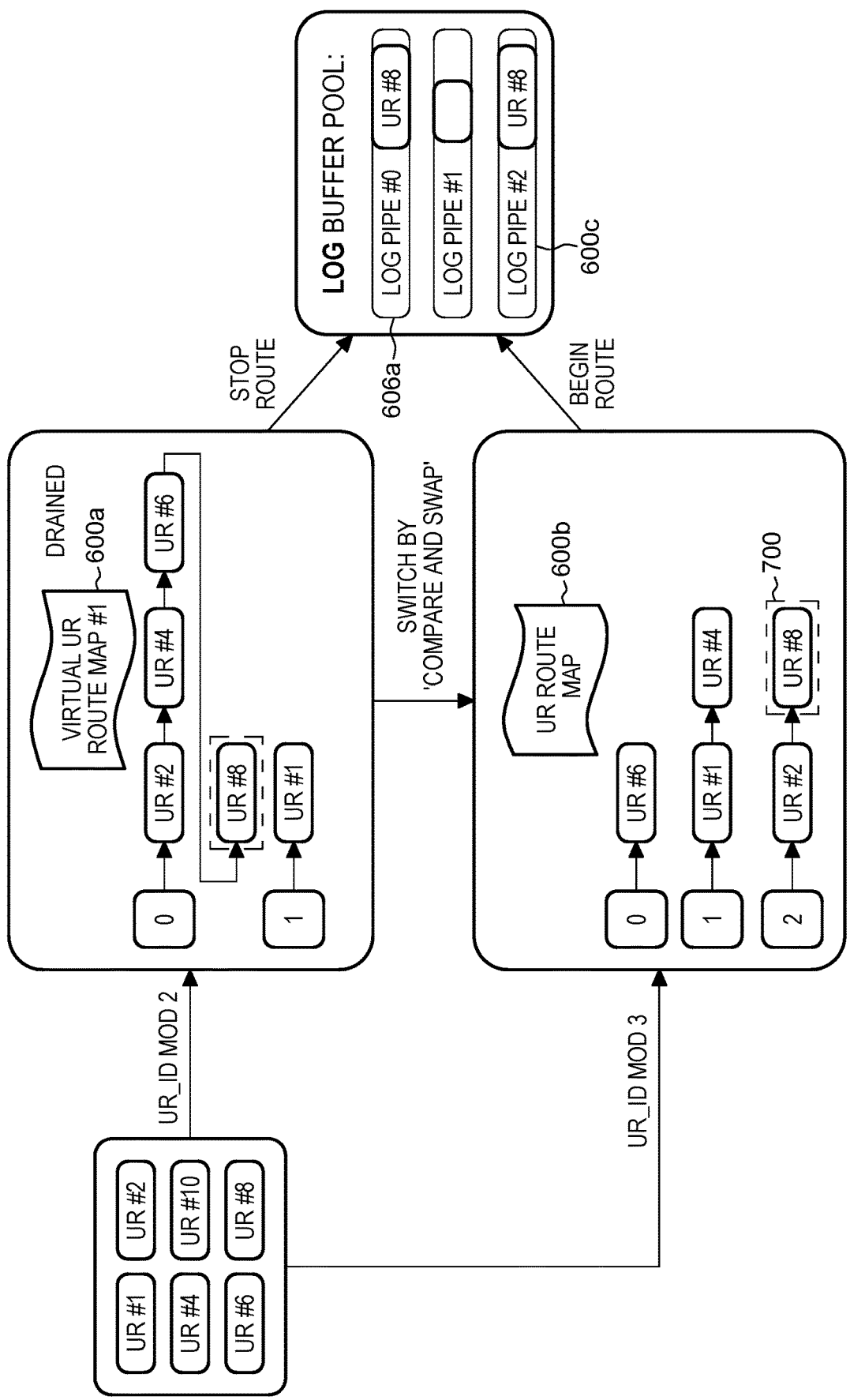
FIG. 7 depicts one example of using a new unit recovery route map to route unit recoveries to log pipelines, in accordance with one or more aspects of the present invention.

Further, with reference to FIGS. 3A and 7, when an existing unit recovery arrives (e.g., one or more log records of the existing UR arrives), map #2 (e.g., 600*b*) is used to route the incoming log information to its corresponding log pipeline (314) assuming the UR_ID has already been re-hashed in map #2. Otherwise, map #1 (e.g., 600*a*) is used to decide which log pipeline is responsible for log information output (316). Consequently, there is no block issue for a log output operation even if one or more splitting or merging operations are performed on the log pipeline. To further explain, if additional log information output (also referred to as data) arrives for an existing unit recovery, that additional log information output, because of the splitting, may be placed in a different log pipeline than the previous received log information output for that existing unit recovery. For instance, log information output for UR #8 (700) was initially routed to log pipeline #0 (606*a*) and now additional log information output for UR #8 (700) is routed to log pipeline #2 (606*c*). In one example, the log information output is not moved from one log pipeline to another based on the splitting. Since log information output may be placed in multiple log pipelines, any UR route maps that include unit recoveries with uncommitted data are maintained to facilitate recovery, if necessary. As previously indicated, recovery is facilitated by maintaining log information output for a particular unit recovery in the same log pipeline. However, based on one or more splitting operations, this may not be maintained, and log information output may be in multiple log pipelines. Therefore, to facilitate recovery, multiple UR route maps are utilized to determine where the log information is buffered and to recover therefrom.

In a further example, log information may be moved from one log pipeline to another based on a split or merge operation. Other variations are possible.

Referring to FIGS. 3B and 7, in one aspect, when a unit recovery is to be cancelled or rolled back, both the original unit recovery route map (e.g., map #1 (600*a*), also referred to as a virtual UR route map since it is no longer the current UR route map) and one or more new unit recovery route maps (e.g., map #2 (600*b*)) are used to locate which one or more log pipelines are to be used for reading undo logs against this unit recovery (320). A restore operation is then performed in terms of the undo logs.

In one example, the original unit recovery route map (e.g., map #1) may be dropped once all the unit recovery IDs are removed from the map indicating that the corresponding unit recoveries are committed (322).

Figure 8A:
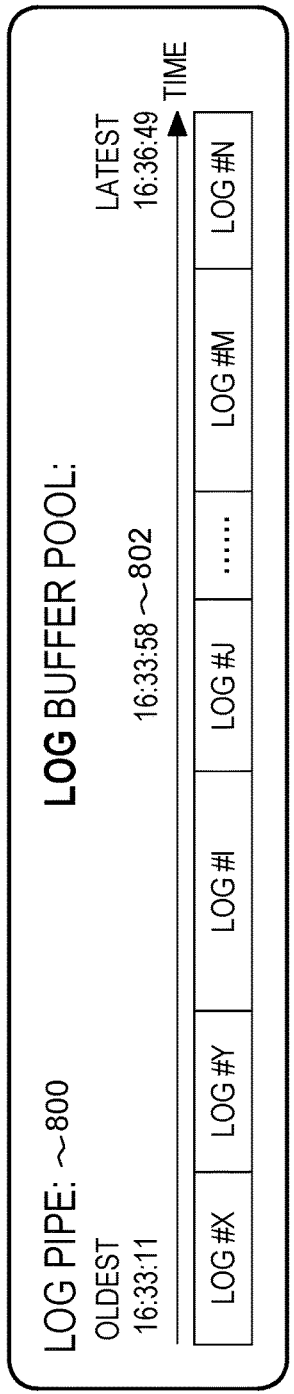
FIGS. 8A-8C depict one example of determining which modified pages may be cast-out from memory to storage, in accordance with one or more aspects of the present invention.

In one aspect, referring to FIGS. 3B and 8A, when log information is written to a log pipe 800, a timestamp 802 is generated for each write operation (324). For instance, based on writing log information Log #X for operation X, a timestamp of 16:33:11 is generated; for log information Log #J, a timestamp of 16:33:58 is generated; for log information Log #N, a timestamp of 16:36:49 is generated; etc. This information is used, in one example, to determine which modified pages of memory may be cast-out from a defer write queue, as described herein.

Figure 8B:
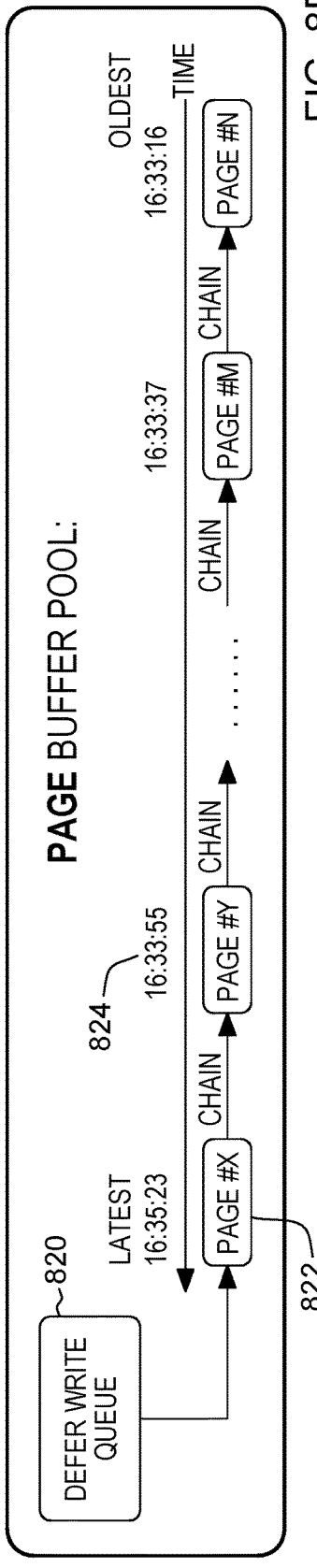

Referring to FIG. 8B, a defer write queue 820 includes a plurality of pages 822 waiting to be written from the page buffer pool to storage (e.g., disk, etc.). Each page 822 included in defer write queue 820 has a timestamp 824 indicating when it was modified and written to the buffer. Timestamps 802 and 824 are used to determine whether a page may be written from the page buffer to storage, as described herein.

Figure 8C:
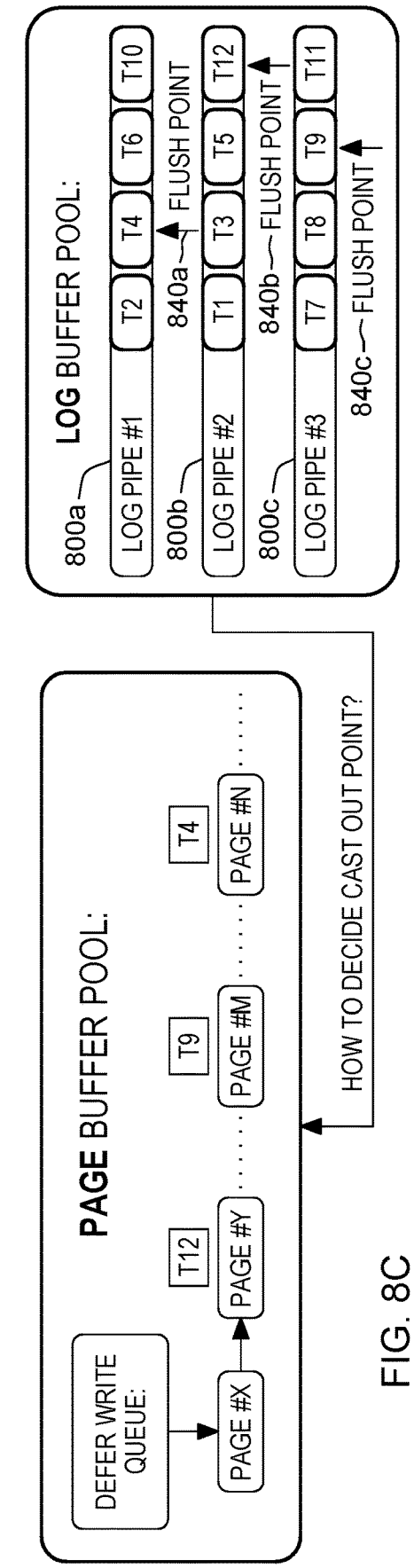

In one example, as shown in FIG. 8C, a flush point 840*a*-840*c* is determined for each log pipeline 800*a*-800*c*. The flush point is a timestamp indicating that log information having a timestamp with a predefined relationship with the flush point (e.g., less than the flush point) has been written from the log pipeline to storage.

Figure 9C:
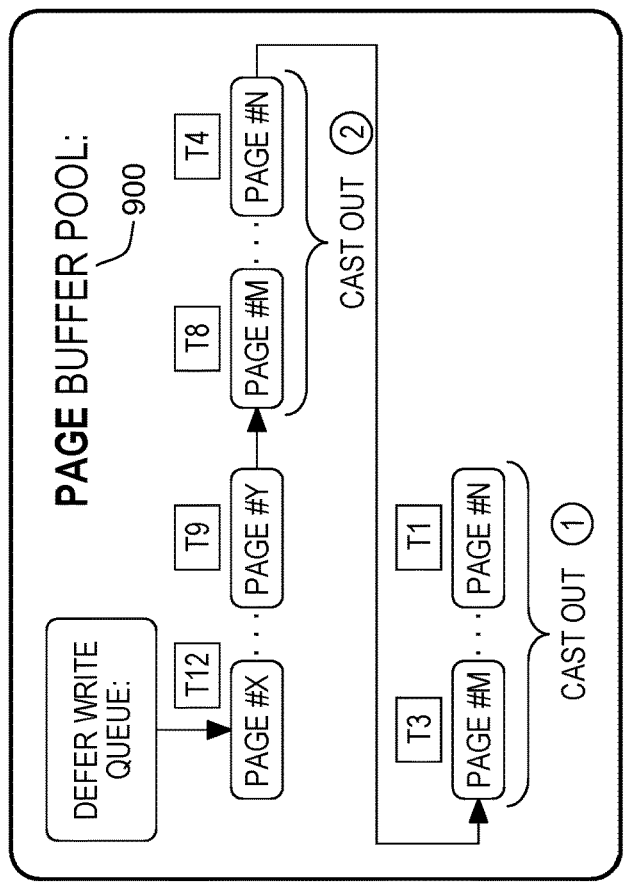
FIG. 9C depicts one example of using minimum log timestamps in writing data from memory to storage, in accordance with one or more aspects of the present invention.
Figure 9A:
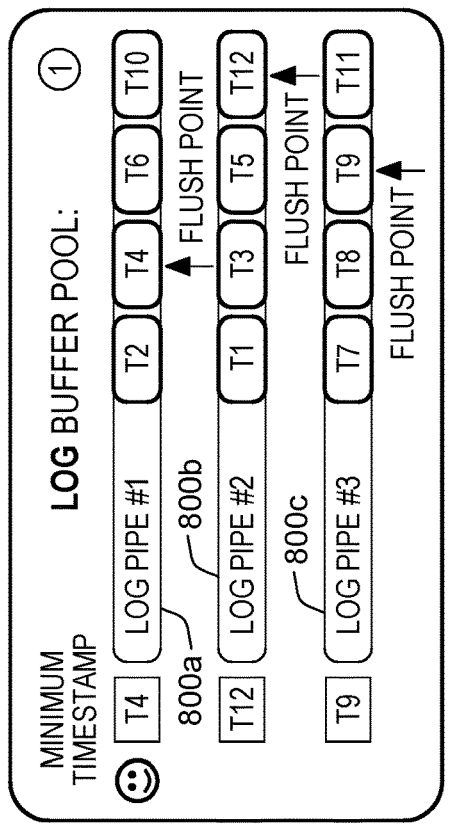
FIGS. 9A-9B depict one example of generating a minimum log timestamp for each log pipeline, in accordance with one or more aspects of the present invention.

In one embodiment, referring to FIGS. 3B and 9A-9C, for each log pipeline (assume the number of pipelines is N), the earliest timestamp of log information flushed out from the log pipeline in memory to a log set in storage is kept (326). Thus, there are N flush timestamps corresponding to the N pipelines. As shown in FIG. 9A, at a particular point in time (1), the flush point for log pipeline 800*a* is T4; the flush point for log pipeline 800*b* is T12; and the flush point for log pipeline 800*c* is T9. A minimum timestamp among the N timestamps is selected to be used as a flush point in a defer write queue to decide which modified pages may be materialized from memory to storage (328). In the example for time (1), T4 is the minimum timestamp, and therefore, pages in a page buffer pool 900 (FIG. 9C) having a timestamp less than the minimum timestamp T4, such as Page #N having a timestamp of T1 and Page #M having a timestamp of T3, are able to be written out from the page buffer pool to storage.

Figure 9B:
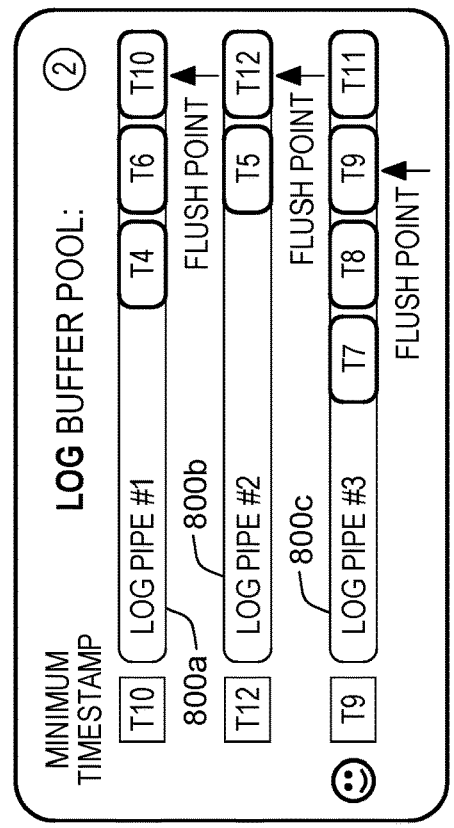

In a further example in FIG. 9B, at another particular point in time (2), the flush point for log pipeline 800*a* is T10; the flush point for log pipeline 800*b* is T12; and the flush point for log pipeline 800*c* is T9. In this example for time (2), T9 is the minimum timestamp, and therefore, pages in page buffer pool 900 (FIG. 9C) having a timestamp less than the minimum timestamp T9, such as Page #N having a timestamp of T4 and Page #M having a timestamp of T8, are able to be written out from the page buffer pool to storage.

Referring to FIG. 3C, in one embodiment, to write the log information from the log pipelines to storage, a log write engine dispatcher deploys one or more log write engines (330) to write log data from the pipelines to storage. This is further described with reference to FIG. 10A. As shown, in one aspect, a log write engine dispatcher 1000 deploys (e.g., initiates, activates, etc.) one or more log write engines 1002 which are used to flush out log information from one or more log pipelines to one or more log sets. Log write engine dispatcher 1000 determines how to optimize the writing of the data from the log pipelines to the log data sets in storage. In one embodiment, to optimize the writing, one or more cells or control intervals (CIs) 1004 are defined. As an example, a control interval is a selected amount of data to be written from a log pipeline (e.g., 4K, 8K, 16K, etc.), and it includes one or more elements, such as, for example, one or more log record headers, one or more log records (e.g., a selected amount of data), and one or more controls. In other embodiments, the control interval includes additional, fewer and/or other elements. In one embodiment, the log data is divided into control intervals, and a plurality of control intervals are written out in parallel by different log write engines based on a write policy. The log write engines may write out control intervals from the same pipe, different pipes and/or a combination of the same pipe and different pipes in parallel. This improves system performance.

In one example, the write policy includes writing 1006 the log information from the log pipelines to storage, as early as possible, as well as prefetching 1008 additional log information to facilitate the writing (e.g., increasing the speed at which the writing is performed) (332). In one embodiment, the earliest timestamp is used by the log write engine dispatcher to determine which control intervals are to be written out by the log write engines. For instance, in one example, since T4 is the earliest timestamp, the log write engine dispatcher determines that CI #2 of log pipe #1 is to be written out by log write engine #1, and in parallel, CI #1 and CI #3 of log pipe #2 are to be written out by log write engine #2 to facilitate the fastest writing.

In one embodiment, the log write engine dispatcher receives information regarding the writing and pre-fetching of the control intervals, and based on a determination that contention on one or more log pipelines is too heavy (e.g., at a prespecified level), the log write dispatcher adjusts which engines are to be writing from which log pipelines and/or deploys/activates additional log write engines 1010 (FIG. 10B) to expedite the flush out process for the one or more busy log pipelines (334), as described herein.

As one example, log write engine dispatcher 1000 determines that another log write engine is to be deployed based on an occupied portion of a log pipe being at a prespecified level (e.g., 85% of total pipe capacity). For instance, the capacity of a log pipe is limited and may be, for example, 100 MB (other sizes are also possible). There is a free potion of the log pipe where new log information is to be written and an occupied portion where log information is to be materialized to disk. If the percentage of the occupied portion takes up too much space (e.g., 85%) of the total log capacity, it indicates that the database system is busy writing data to storage. Thus, in one example, an additional log write engine 1010 is deployed to expedite log data materialization to storage. In a further example, multiple write engines may be assigned to write from one log pipeline. As shown in FIG. 10B, in one example, log write engines #1 and #2 are assigned to write/prefetch from log pipe #1, and log write engines #3 and #4 are assigned to write/prefetch from log pipe #2. These assignments are dynamically changed by the log write engine dispatcher, as needed, to expeditiously write from the log pipelines.

In one or more aspects, when a database system is under a restart or recovery process, one or more stored log records are used in the recovery or restart process. For instance, one or more records are read from storage into memory and are applied in a redo operation, and/or one or more records are read from storage into memory and are applied in an undo operation. With a redo operation, log records are read in a forward direction, and for an undo operation, log records are read in a backward direction. However, the reading in a forward or backward direction is to be modified when there are multiple log pipelines to be recovered for a particular unit recovery, since the logs are not necessarily in order. In one example, for the redo and undo operations, logs are to be applied in-order, when the logs are in a same unit of memory (e.g., same memory page). When the logs are in different units of memory (different memory pages), the logs may be applied out-of-order.

Continuing with FIG. 3C, when the database system is under a restart or recovery process, the following is performed, in one embodiment, since the log records within the log sets are out-of-order due to multiple log pipelines being used:

(1) Sort and merge log records according to a unit recovery identifier (e.g., UR_ID+Log Timestamp) to determine which database object (such as a data page) is to be rolled back using a database log undo operation (340);

(2) Sort and merge log records according to a unique page identifier (e.g., database DB_ID+Page Set ID+Partition ID+Page ID+Log Timestamp) to be as the input for a re-submit by a log redo operation (342); and (3) Trigger log apply according to the results generated from the sort operations to accomplish restart or recovery of the database system (344).

Figure 11:
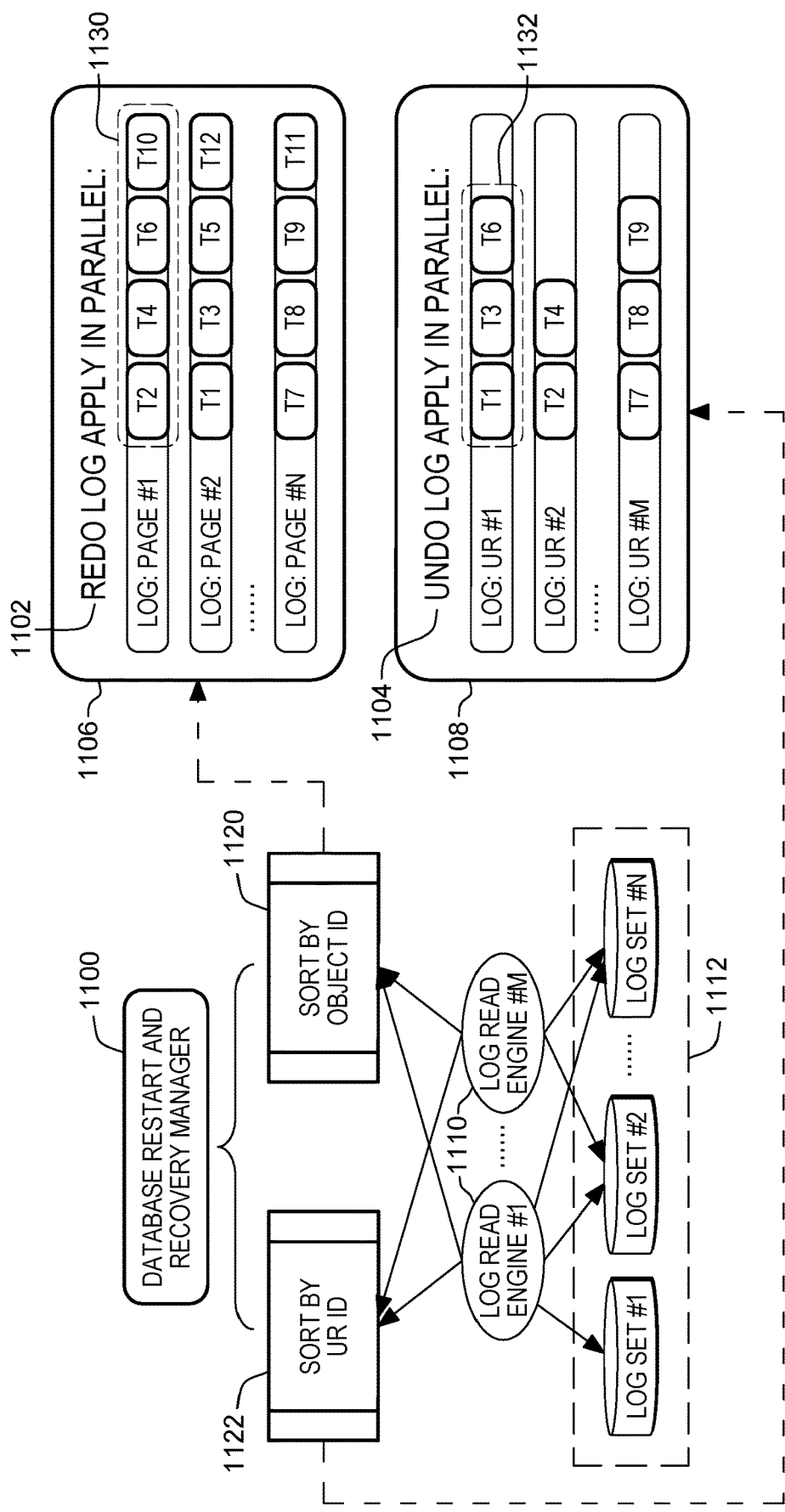
FIG. 11 depicts one example of sorting log records for database restart and/or recovery, in accordance with one or more aspects of the present invention.

Referring to FIG. 11, in one embodiment, a database restart and recovery manager 1100 manages a redo operation 1102 against a sort result 1106 and/or an undo operation 1104 against a sort result 1108. In performing the redo operation, one or more log read engines 1110 read the log records from storage 1112 into memory and then sort the obtained log records based on, for instance, object identifiers 1120 (e.g., unique page identifiers). The sorted log records 1106 are then provided to a redo operation 1102 and the redo operation is applied against the sorted log records in parallel, as described below.

Further, for the undo operation 1104, one or more log read engines 1110 read the log records from storage 1112 into memory and then sort the obtained log records based on, for instance, unit recovery identifiers 1122. The sorted log records 1108 are provided to an undo operation 1104 and the undo operation is applied against the sorted log records in parallel, as described below.

For a database restart or recovery, in one embodiment, a redo operation 1102 is triggered against the sort result 1106 based on log units 1130. For example, log records T2, T4, T6, and T10 are considered as one log unit since these log records are under a same page #1 (object ID). Similarly, T1, T3, T5 and T12 are considered another log unit, etc. Within each log unit, the sorted log records (e.g., T2, T4, T6 and T10 for one log unit) are applied in a forward direction (e.g., from left to right). These log units 1130 are applied in parallel to expedite the redo operation process.

Additionally, an undo operation 1104 is triggered against a sort result 1108 based on each log unit 1132 (such as: T1, T3 and T6 is composed into one log unit; T2 and T4 in another log unit, etc.). Within each log unit, log records (e.g., T1, T3, and T6 for one log unit) are applied in a backward direction (e.g., from right to left). These log units 1132 are applied in parallel to expedite the undo operation process.

For both redo and undo, although the recovery process is performed, in one embodiment, in parallel, data integrity is maintained. By performing the recovery process in parallel, the recovery process is expedited, thereby increasing system performance.

Figure 12B:
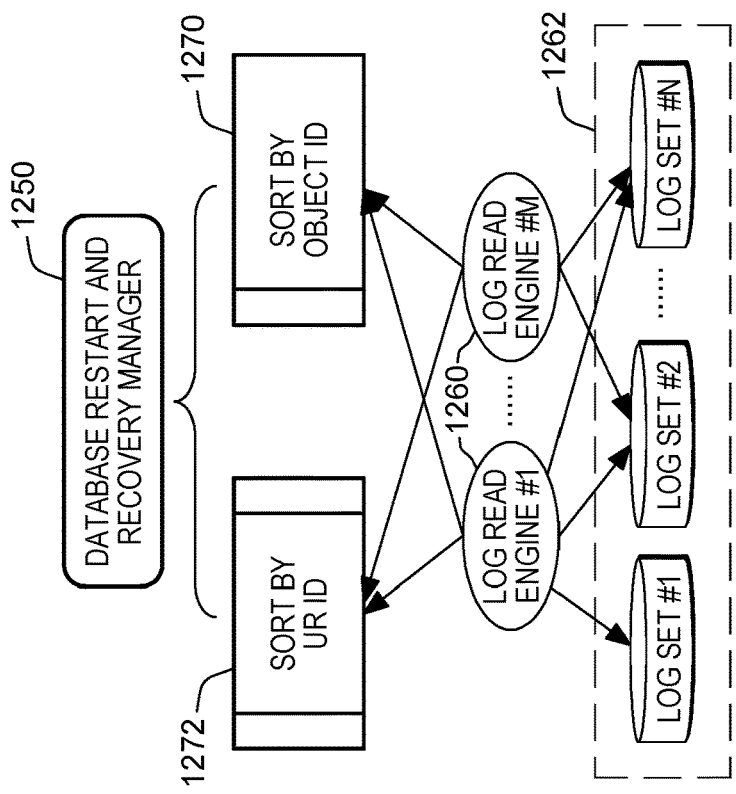
FIG. 12B depicts one example of sorting log records for database recovery and/or restart, in accordance with one or more aspects of the present invention.
Figure 12A:
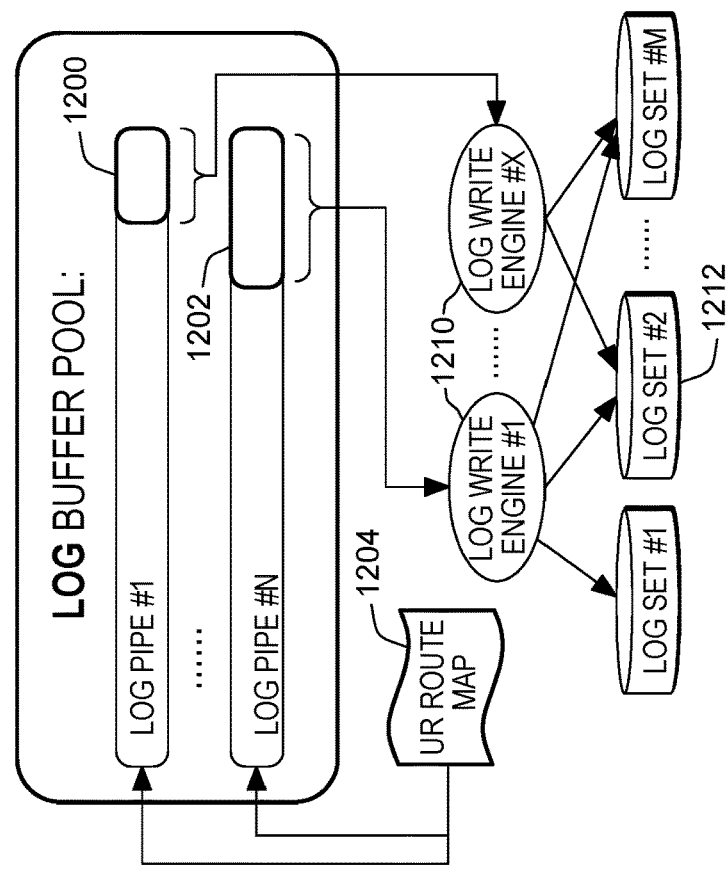
FIG. 12A depicts one example of a split operation to create one or more additional log pipelines and deploying one or more additional log write engines, in accordance with one or more aspects of the present invention.

As described above and with respect to FIG. 12A, in one or more aspects, based on a determination that contention on a log pipeline 1200 is too high, a split operation is performed to define at least one other log pipeline 1202. Log records are then written to the log pipelines based on one or more unit recovery route maps 1204. Further, one or more log write engines 1210 are used to write log information from the log pipelines to log data sets 1212 in storage.

The splitting of log pipelines and/or the deploying of additional log write engines facilitate the writing of data to log pipelines and the writing of log data from the log pipelines to storage, reducing contention and improving system performance. The merging of log pipelines reduces the use of system resources, improving system performance.

Further, to perform restart and/or recovery using, e.g., stored log data, a database restart and recovery manager 1250 manages a redo operation and/or an undo operation on one or more log units. In performing the redo operation, one or more log read engines 1260 read the log records from storage 1262 into memory and then sort the obtained log records based on, for instance, object identifiers 1270 (e.g., unique page identifiers). The sorted log records are then used as input to the redo operation and the redo operation is applied in parallel on the sorted log records of the log units. Further, for the undo operation, one or more log read engines 1260 read the log records from storage 1262 into memory and then sort the obtained log records based on, for instance, unit recovery identifiers 1272. The sorted log records are then used as input to the undo operation and the undo operation is applied in parallel on the sorted log records of the log units.

Although various embodiments are described herein, other variations and embodiments are possible. It should be noted that, unless otherwise inconsistent, each aspect or feature described herein, and variants thereof, may be combinable with any other aspect or feature.

One or more aspects of the present invention are inextricably tied to computer technology and facilitate processing within a computer, improving performance thereof. In one example, performance enhancement is provided by automatically splitting and/or merging log pipelines, automatically deploying one or more additional write engines, and/or sorting/merging log records for database restart/recovery.

Aspects of one embodiment of facilitating processing within a computing environment, as related to one or more aspects of database-related processing, are described with reference to FIGS. 13A-13C.

In one aspect, with reference to FIG. 13A, a determination is made as to whether contention in writing data to a log pipeline is at a prespecified level 1300. The log pipeline is used, for instance, in writing the data from memory to storage 1301. Based on determining that contention in writing the data to the log pipeline is at the prespecified level, a split operation is automatically performed to create a new log pipeline 1302.

By performing the split operation, contention on the log pipeline is reduced and a rate at which data is able to be written to the log pipelines is increased, thereby enabling data to be written to storage faster, increasing system performance.

In one aspect, incoming data is routed to a selected log pipeline based on a route map 1304. The route map includes an indication of which log pipeline of a plurality of log pipelines is to receive the incoming data 1306. The plurality of log pipelines includes, for instance, at least the log pipeline and the new log pipeline 1308. The use of a route map facilitates tracking where the log data is written in the log pipelines, which facilitates, at the very least, restart and/or recovery operations.

As an example, the routing indicated by the route map is determined using modulo arithmetic of a selected identifier 1310. A modulo number used in the modulo arithmetic is based on, for instance, a number of log pipelines in the plurality of log pipelines 1312. In one example, the selected identifier is an identifier of a unit recovery 1314, in which the unit recovery includes, for instance, one or more operations generating the incoming data 1316. In one embodiment, the route map is created based on creating the new log pipeline 1318. As an example, the creating of the route map (e.g., a new route map) enables a log pipeline split/merge process to be performed without requiring a lock/latch on one or more predecessor route maps.

With reference to FIG. 13B, in one aspect, a determination is made as to whether one or more units of data (e.g., pages) are to be written from memory (e.g., a page buffer) to storage 1330. The determining is based, for instance, on one or more flush points within one or more log pipelines 1332. Based on determining that the one or more units of data are to be written from memory to storage, the one or more units of data are written from memory to storage 1334.

In one embodiment, a determination is made of a minimum flush point for the one or more log pipelines 1336. Further, the determination of whether a unit of data of the one or more units of data is to be written from memory to storage includes determining whether the unit of data has a timestamp that has a predefined relationship with the minimum flush point (e.g., less than), in which the writing the unit of data is performed, based on the unit of data having the timestamp that has the predefined relationship with the minimum flush point 1338. This enables pages of data, as an example, to be written to storage concurrently with writing data to the log pipes, which increases system performance.

In one aspect, log data is written from one or more log pipelines to storage, using a log write engine 1350. Further, in one aspect, a determination is automatically made as to whether one or more additional log write engines are to be deployed to write the log data from the one or more log pipelines 1352. Based on determining that the one or more additional log write engines are to be deployed, the one or more additional log write engines are deployed 1354. By providing additional log write engines, the speed at which data may be written to storage is increased thereby, increasing system performance. Further, in one or more aspects, by increasing the speed at which log data may be written to storage, the speed at which modified pages of memory may be written from memory to storage is also increased.

In one aspect, with reference to FIG. 13C, a determination is made as to whether recovery is to be performed for one or more database objects 1370. Based on determining that recovery is to be performed, a plurality of records read from storage are sorted using a first technique to provide a first plurality of sorted records 1372. The first plurality of sorted records includes a first plurality of log units 1374. The first plurality of sorted records is provided to a redo operation 1376. The redo operation is to be performed in parallel on the first plurality of log units 1378. This enables database recovery processing to be performed in parallel while maintaining data integrity.

In one aspect, a determination is made as to whether recovery is to be performed for one or more database objects 1380. Based on determining that recovery is to be performed, a plurality of records read from storage are sorted using a second technique to provide a second plurality of sorted records 1382. The second plurality of sorted records includes a second plurality of log units 1384. The second plurality of sorted log records is provided to an undo operation 1386. The undo operation is to be performed in parallel on the second plurality of log units 1388. This enables database recovery processing to be performed in parallel while maintaining data integrity.

In one aspect, a determination is made as to whether contention in writing data to one or more log pipelines is at another prespecified level 1390. Based on determining that contention in writing the data to the one or more log pipelines is at the other prespecified level, a merge operation is performed to reduce a number of log pipelines 1392. By performing the merge operation, fewer log pipelines and thus fewer system resources are utilized.

Other embodiments, aspects and/or variations are possible.

Figure 14A:
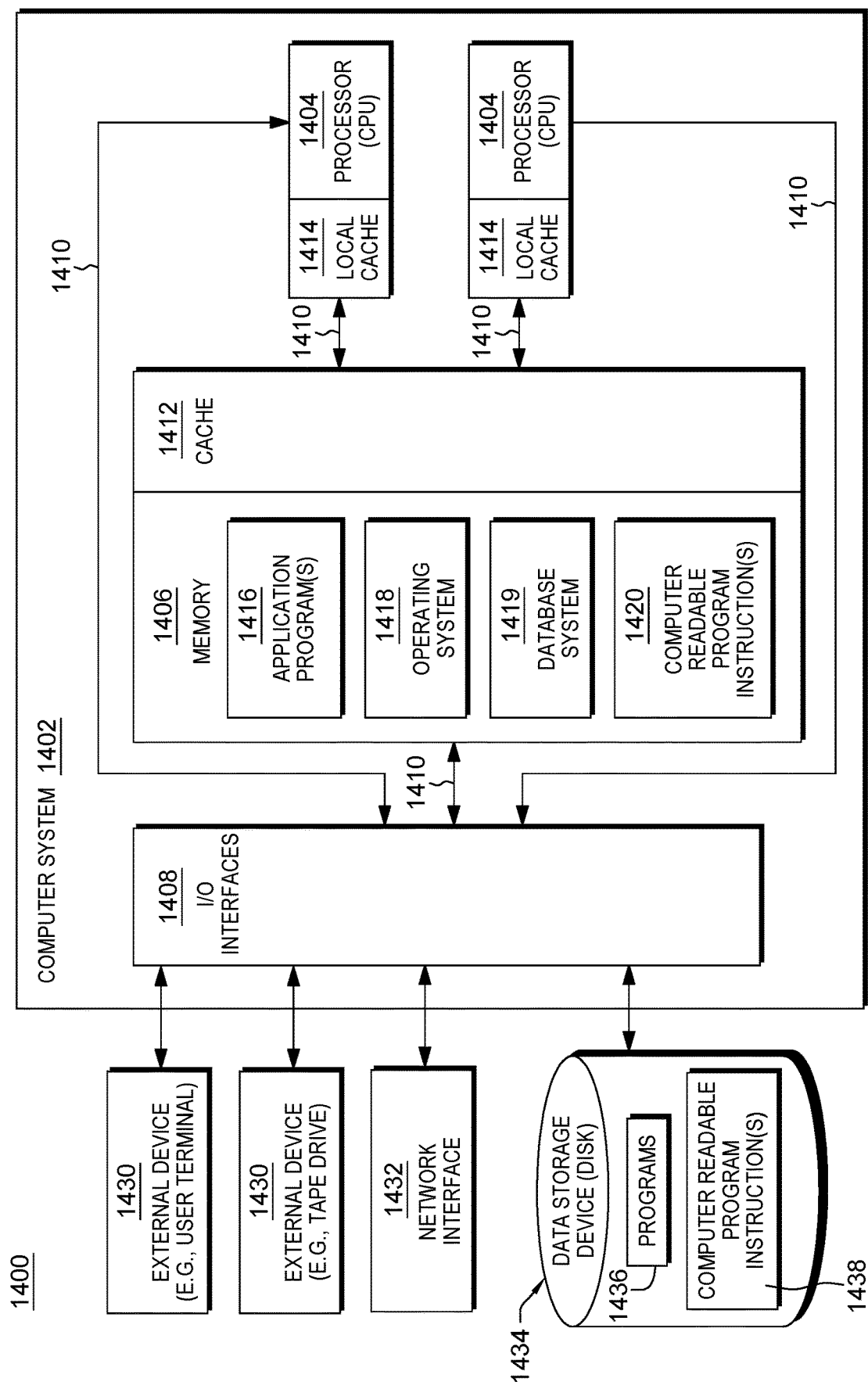
FIG. 14A depicts one example of a computing environment in which to incorporate and use one or more aspects of the present invention.

One or more aspects of the present invention are performed by a database system included within a computing environment, an example of which is depicted in FIG. 14A. As shown in FIG. 14A, a computing environment 1400 includes, for instance, a computer system 1402 shown, e.g., in the form of a general-purpose computing device. Computer system 1402 may include, but is not limited to, one or more processors or processing units 1404 (e.g., central processing units (CPUs)), a memory 1406 (a.k.a., system memory, main memory, main storage, central storage, as examples), and one or more input/output (I/O) interfaces 1408, coupled to one another via one or more buses and/or other connections 1410.

Bus 1410 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1406 may include, for instance, a cache 1412, such as a shared cache, which may be coupled to local caches 1414 of processors 1404. Further, memory 1406 may include one or more programs or applications 1416, an operating system 1418, a database system 1419, and one or more computer readable program instructions 1420. Computer readable program instructions 1420 may be configured to carry out functions of embodiments of aspects of the invention.

Computer system 1402 may also communicate via, e.g., I/O interfaces 1408 with one or more external devices 1430 and a network interface 1432. External devices 1430 include, for example, a user terminal, a tape drive, a pointing device, a display, etc., as well as one or more data storage devices 1434 (e.g., storage, such as disk, etc.). Data storage device 1434 may store one or more programs 1436, one or more computer readable program instructions 1438, and/or data (e.g., modified pages written to storage, log data written to storage, etc.), etc. The computer readable program instructions may be configured to carry out functions of embodiments of aspects of the invention.

Network interface 1432 enables computer system 1402 to communicate with one or more networks, such as a local area network (LAN), a general wide area network (WAN), and/or a public network (e.g., the Internet), providing communication with other computing devices or systems.

Computer system 1402 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 1402. Examples include, but are not limited to: microcode, device drivers, redundant processing units, external disk drive arrays, RAID systems, tape drives, and data archival storage systems, etc.

Computer system 1402 may be operational with numerous other general-purpose or special-purpose computing system environments or configurations. Examples of well-known computing systems, environments, and/or configurations that may be suitable for use with computer system 1402 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, database system 1419 includes one or more components to perform one or more aspects of the present invention. These components may be stored in memory, including main memory (e.g., memory 1406) and/or one or more caches (e.g., cache 1412, local cache 1414) and/or external storage (e.g., device 1434), and may be executed by one or more processors (e.g., processor 1404).

Figure 14B:
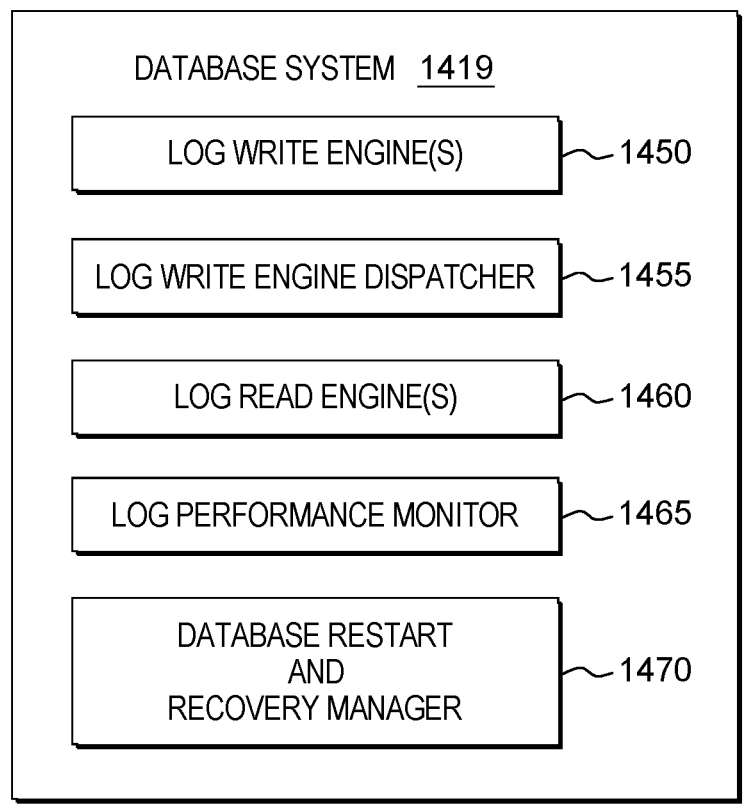
FIG. 14B depicts one example of components of a database system of the computing environment of FIG. 14A to be used to perform one or more aspects of the present invention.

In one example, referring to FIG. 14B, the components include, for instance:

One or more log write engines 1450 used, for instance, to write data from one or more log pipelines to storage;

Log write engine dispatcher 1455 used, for instance, to determine when one or more additional log write engines are to be deployed (e.g., automatically);

One or more log read engines 1460 used, for instance, to read data from storage into memory for, e.g., a database restart and/or recovery;

Log performance monitor 1465 used, for instance, to determine when a split and/or merge operation is to be performed; and Database restart and recovery manager 1470 used, for instance, to perform restart and/or recovery of one or more database objects.

Although various components are described, aspects of the invention may be performed by one or more of the components. There may be additional, fewer and/or different components used to perform one or more aspects of the present invention. Many variations are possible.

Figure 15A:
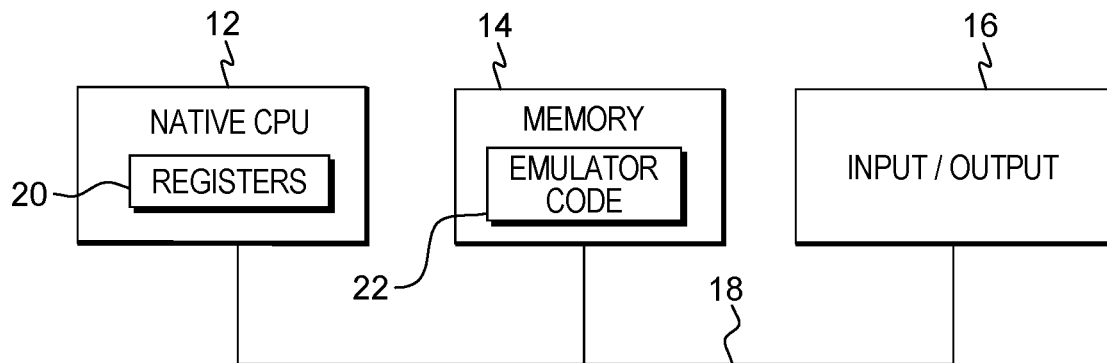
FIG. 15A depicts another example of a computing environment in which to incorporate and use one or more aspects of the present invention.

Further other types of computing environments may also incorporate and use one or more aspects of the present invention, including, but not limited to, emulation environments, an example of which is described with reference to FIG. 15A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, for instance, the z/Architecture® hardware architecture offered by International Business Machines Corporation, such as PowerPC® processors, HP Superdome servers or others, to emulate, for instance, the z/Architecture® hardware architecture and to execute software and instructions developed based on, for instance, the z/Architecture® hardware architecture. Z/ARCHITECTURE is a trademark or registered trademark of International Business Machines Corporation in at least one jurisdiction.

Figure 15B:
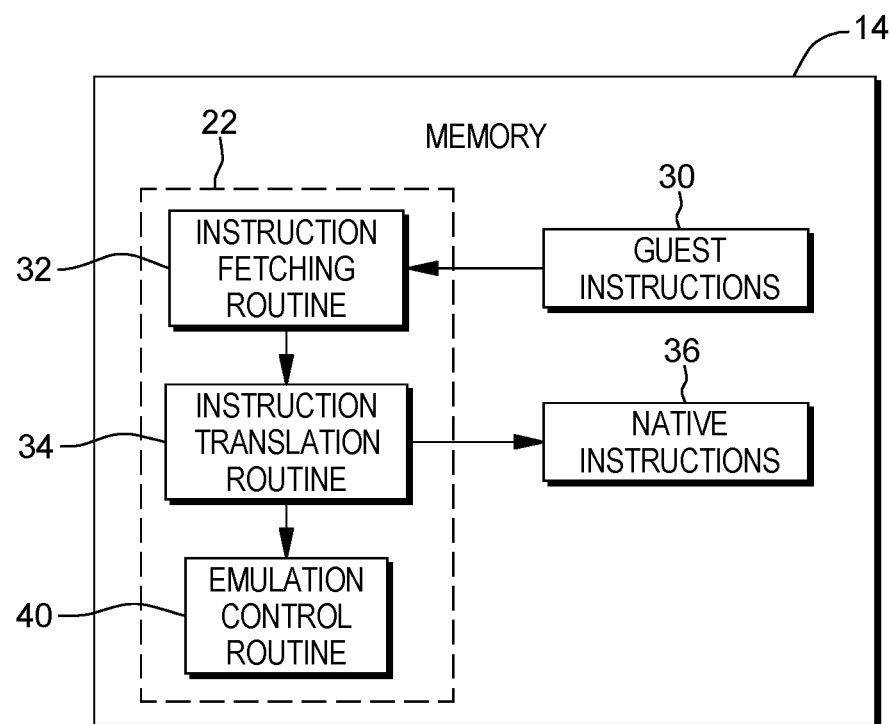
FIG. 15B depicts further details of the memory of FIG. 15A, in accordance with one or more aspects of the present invention.

Further details relating to emulator code 22 are described with reference to FIG. 15B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture® hardware architecture, but instead, are being emulated on native CPU 12, which may be, for example, an Intel® Itanium® II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

One or more aspects of the present invention may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
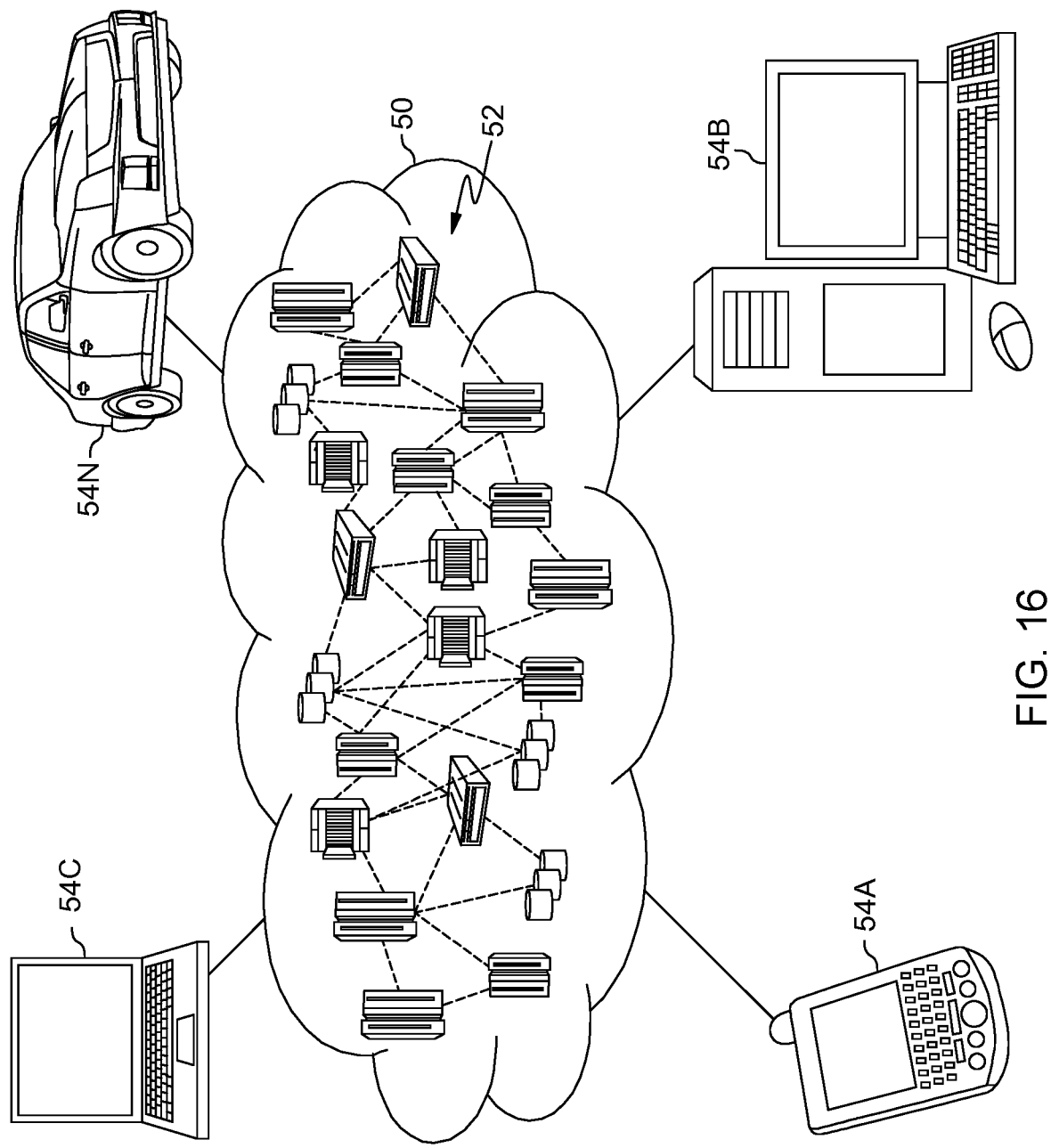
FIG. 16 depicts one embodiment of a cloud computing environment, in accordance with one or more aspects of the present invention.

Referring now to FIG. 16, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 52 and cloud computing environment 50 can communicate with any type of computerized device over any type of network and/or network addressable connection (e.g., using a web browser).

Figure 17:
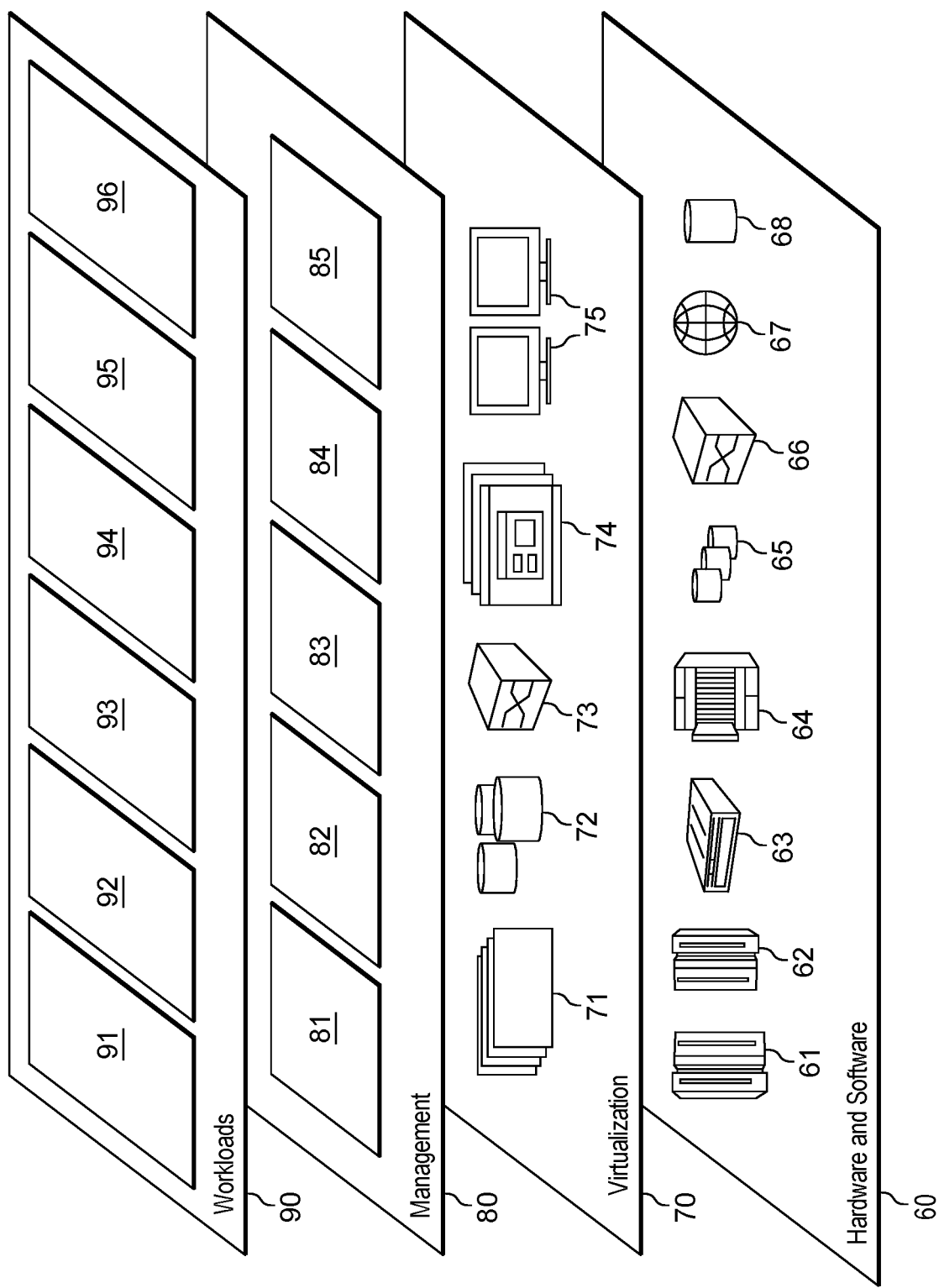
FIG. 17 depicts one example of abstraction model layers, in accordance with one or more aspects of the present invention.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database-related processing 96.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for database-related processing, in accordance with one or more aspects of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, splitting and/or merging may be performed based on other criteria and/or differently than described herein. Further, other soring techniques may be used. Additionally, the deploying of additional write log engines may be based on other criteria. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage mediums and program instructions collectively stored on the one or more computer readable storage mediums to perform a method comprising:
      monitoring a log pipeline to determine whether unavailability of a system resource used in writing data to the log pipeline is causing contention on the log pipeline, the log pipeline to be used in writing the data to storage;
      determining whether the contention on the log pipeline in writing the data to the log pipeline is at a pre-specified level; and
      automatically performing a split operation to create a new log pipeline, based on determining that the contention in writing the data to the log pipeline is at the prespecified level, the new log pipeline being in addition to and separate from the log pipeline.

2. The computer program product of claim 1, wherein the method further comprises routing incoming data to a selected log pipeline based on a route map, the route map including an indication of which log pipeline of a plurality of log pipelines is to receive the incoming data, the plurality of log pipelines including at least the log pipeline and the new log pipeline.

3. The computer program product of claim 2, wherein the routing indicated by the route map is determined using modulo arithmetic of a selected identifier, a modulo number used in the modulo arithmetic being based on a number of log pipelines in the plurality of log pipelines.

4. The computer program product of claim 3, wherein the selected identifier is an identifier of a unit recovery, the unit recovery including one or more operations generating the incoming data.

5. The computer program product of claim 2, wherein the method further comprises creating the route map based on creating the new log pipeline.

6. The computer program product of claim 1, wherein the method further comprises:
   determining whether one or more units of data are to be written from memory to the storage, the determining being based on one or more flush points within one or more log pipelines; and
   writing the one or more units of data from the memory to the storage, based on determining that the one or more units of data are to be written from the memory to the storage.

7. The computer program product of claim 6, wherein the method further comprises determining a minimum flush point for the one or more log pipelines, and wherein the determining whether a unit of data of the one or more units of data is to be written from the memory to the storage includes determining whether the unit of data has a timestamp that has a predefined relationship with the minimum flush point, wherein the writing the unit of data is performed based on the unit of data having the timestamp that has the predefined relationship with the minimum flush point.

8. The computer program product of claim 1, wherein the method further comprises:
   writing, using a log write engine, log data from one or more log pipelines to the storage;
   automatically determining whether one or more additional log write engines are to be deployed to write the log data from the one or more log pipelines; and
   deploying the one or more additional log write engines, based on determining that the one or more additional log write engines are to be deployed.

9. The computer program product of claim 1, wherein the method further comprises:
   determining recovery is to be performed for one or more database objects;
   sorting, based on determining that recovery is to be performed, a plurality of records read from the storage using a first technique to provide a first plurality of sorted records, the first plurality of sorted records including a first plurality of log units; and
   providing the first plurality of sorted records to a redo operation, the redo operation to be performed in parallel on the first plurality of log units.

10. The computer program product of claim 1, wherein the method further comprises:
   determining recovery is to be performed for one or more database objects;
   sorting, based on determining that recovery is to be performed, a plurality of records read from the storage using a second technique to provide a second plurality of sorted records, the second plurality of sorted records including a second plurality of log units; and
   providing the second plurality of sorted log records to an undo operation, the undo operation to be performed in parallel on the second plurality of log units.

11. The computer program product of claim 1, wherein the method further comprises:
   determining whether the contention in writing the data to one or more log pipelines is at another prespecified level; and
   performing a merge operation to reduce a number of log pipelines, based on determining that the contention in writing the data to the one or more log pipelines is at the other prespecified level.

12. The computer program product of claim 1, wherein the log pipeline includes a plurality of log entries, and the data is log data.

13. A computer system for facilitating processing within a computing environment, the computer system comprising:
   a memory; and
   at least one processor in communication with the memory, wherein the computer system is configured to perform a method, said method comprising:
     monitoring a log pipeline to determine whether unavailability of a system resource used in writing data to the log pipeline is causing contention on the log pipeline, the log pipeline to be used in writing the data to storage;
     determining whether the contention on the log pipeline in writing the data to the log pipeline is at a prespecified level; and
     automatically performing a split operation to create a new log pipeline, based on determining that the contention in writing the data to the log pipeline is at the prespecified level, the new log pipeline being in addition to and separate from the log pipeline.

14. The computer system of claim 13, wherein the method further comprises routing incoming data to a selected log pipeline based on a route map, the route map including an indication of which log pipeline of a plurality of log pipelines is to receive the incoming data, the plurality of log pipelines including at least the log pipeline and the new log pipeline.

15. The computer system of claim 13, wherein the method further comprises:
   writing, using a log write engine, log data from one or more log pipelines to the storage;
   automatically determining whether one or more additional log write engines are to be deployed to write the log data from the one or more log pipelines; and
   deploying the one or more additional log write engines, based on determining that the one or more additional log write engines are to be deployed.

16. The computer system of claim 13, wherein the method further comprises:
   determining recovery is to be performed for one or more database objects;
   sorting, based on determining that recovery is to be performed, a plurality of records read from the storage using a first technique to provide a first plurality of sorted records, the first plurality of sorted records including a first plurality of log units; and
   providing the first plurality of sorted records to a redo operation, the redo operation to be performed in parallel on the first plurality of log units.

17. The computer system of claim 13, wherein the method further comprises:
   determining recovery is to be performed for one or more database objects;
   sorting, based on determining that recovery is to be performed, a plurality of records read from the storage using a second technique to provide a second plurality of sorted records, the second plurality of sorted records including a second plurality of log units; and
   providing the second plurality of sorted log records to an undo operation, the undo operation to be performed in parallel on the second plurality of log units.

18. The computer system of claim 13, wherein the method further comprises:
   determining whether the contention in writing the data to one or more log pipelines is at another prespecified level; and
   performing a merge operation to reduce a number of log pipelines, based on determining that the contention in writing the data to the one or more log pipelines is at the other prespecified level.

19. The computer system of claim 13, wherein the log pipeline includes a plurality of log entries, and the data is log data.

20. A computer-implemented method of facilitating processing within a computing environment, the computer-implemented method comprising:
   monitoring a log pipeline to determine whether unavailability of a system resource used in writing data to the log pipeline is causing contention on the log pipeline, the log pipeline to be used in writing the data to storage;
   determining whether the contention on the log pipeline in writing the data to the log pipeline is at a prespecified level; and
   automatically performing a split operation to create a new log pipeline, based on determining that the contention in writing the data to the log pipeline is at the prespecified level, the new log pipeline being in addition to and separate from the log pipeline.

21. The computer-implemented method of claim 20, further comprising routing incoming data to a selected log pipeline based on a route map, the route map including an indication of which log pipeline of a plurality of log pipelines is to receive the incoming data, the plurality of log pipelines including at least the log pipeline and the new log pipeline.

22. The computer-implemented method of claim 20, further comprising:
   writing, using a log write engine, log data from one or more log pipelines to the storage;
   automatically determining whether one or more additional log write engines are to be deployed to write the log data from the one or more log pipelines; and
   deploying the one or more additional log write engines, based on determining that the one or more additional log write engines are to be deployed.

23. The computer-implemented method of claim 20, wherein the log pipeline includes a plurality of log entries, and the data is log data.

24. The computer-implemented method of claim 20, further comprising:
   determining whether the contention in writing the data to one or more log pipelines is at another prespecified level; and
   performing a merge operation to reduce a number of log pipelines, based on determining that the contention in writing the data to the one or more log pipelines is at the other prespecified level.

25. The computer-implemented method of claim 21, wherein the routing indicated by the route map is determined using modulo arithmetic of a selected identifier, a modulo number used in the modulo arithmetic being based on a number of log pipelines in the plurality of log pipelines, and wherein the selected identifier is an identifier of a unit recovery, the unit recovery including one or more operations generating the incoming data.

\* \* \* \* \*